United States Patent
Kakizawa

[11] Patent Number: 5,835,180
[45] Date of Patent: Nov. 10, 1998

[54] TELEPHONE AND KEY TELEPHONE SYSTEM HAVING ELECTRONIC DIRECTORY FUNCTION

[75] Inventor: Katsuhiro Kakizawa, Yokohama, Japan

[73] Assignee: Canon Kabushiki Kaisha, Tokyo, Japan

[21] Appl. No.: 427,651

[22] Filed: Apr. 20, 1995

Related U.S. Application Data

[63] Continuation of Ser. No. 6,424, Jan. 19, 1993.

[30] Foreign Application Priority Data

Jan. 20, 1992 [JP] Japan ................................. 4-028935
May 26, 1992 [JP] Japan ................................. 4-158570

[51] Int. Cl.⁶ ................................................ H04M 1/00
[52] U.S. Cl. ........................ 379/165; 379/157; 379/163
[58] Field of Search .................................. 379/157, 163, 379/165, 354, 355, 356

[56] References Cited

U.S. PATENT DOCUMENTS

| | | | |
|---|---|---|---|
| 4,803,718 | 2/1989 | Neil | 379/163 |
| 4,908,853 | 3/1990 | Matsumoto | 379/354 |
| 4,924,496 | 5/1990 | Figa et al. | 379/355 |
| 4,980,910 | 12/1990 | Oba et al. | 379/354 |
| 4,982,423 | 1/1991 | Muroi | 379/355 |
| 5,034,976 | 7/1991 | Sato | 379/355 |
| 5,054,058 | 10/1991 | Kakizawa | 379/216 |
| 5,067,150 | 11/1991 | Satomi | 379/354 |
| 5,119,417 | 6/1992 | Suzuki | 379/355 |
| 5,134,653 | 7/1992 | Satomi et al. | 379/354 |
| 5,134,717 | 7/1992 | Rasmussen | 379/354 |
| 5,189,696 | 2/1993 | Yoshida | 379/356 |
| 5,222,127 | 6/1993 | Fukui | 379/131 |
| 5,267,308 | 11/1993 | Jokinen et al. | 379/356 |

FOREIGN PATENT DOCUMENTS

| | | |
|---|---|---|
| 60-254956 | 12/1985 | Japan . |
| 63-59093 | 3/1988 | Japan . |
| 2-237347 | 9/1990 | Japan . |
| 3-85849 | 4/1991 | Japan . |
| 3-208447 | 9/1997 | Japan . |

*Primary Examiner*—Vijay Shankar
*Attorney, Agent, or Firm*—Morgan & Finnegan LLP

[57] ABSTRACT

A key telephone system having user-friendly electronic directory function in which dialling numbers more than the number of abbreviated dialling numbers can be registered and the number of digits of abbreviated dialling number is maintained to a small number by treating separately an abbreviated dialling data and other directory data upon registration of data. Further, the content of a retrieved directory data can be registered as an abbreviated dialling number. In the system, a necessary number of data can be registered in the directory, and calling operation using an abbreviated dialling number can be made with a fixed number of digits of abbreviated dialling number regardless of the number of abbreviated dialling numbers. Further, registration of abbreviated dialling number can be performed effectively.

24 Claims, 26 Drawing Sheets

DIRECTORY DATA MEMORY BLOCK

DATA MANAGEMENT
MEMORY BLOCK

ABBREVIATED NUMBER
INDEX MEMORY BLOCK

WORK MEMORY BLOCK

DIRECTORY DATA MEMORY BLOCK

DATA MANAGEMENT
MEMORY BLOCK

COMMON ABBREVIATED
NUMBER INDEX MEMORY BLOCK

INDIVIDUAL ABBREVIATED
NUMBER INDEX MEMORY BLOCK

TELEPHONE AND KEY TELEPHONE SYSTEM HAVING ELECTRONIC DIRECTORY FUNCTION

This is a continuation of co-pending application Ser. No. 08/006,424, filed on Jan. 19, 1993.

BACKGROUND OF THE INVENTION

The present invention relates to a telephone and key telephone system having an electronic directory function for registering and retrieving a dialling data and a corresponding abbreviated name.

Conventionally, telephones and key telephone systems with an electronic directory function have provided a directory formed by registering abbreviated dialling numbers. In the directory, the number of the registered data corresponds with that of the abbreviated dialling numbers, since the data have been registered as abbreviated dialling numbers.

Upon searching of registered data, an abbreviated name to be searched is inputted in katakana (the square form of Japanese syllabary) using dialling keys or an abbreviated dialling number is inputted and the retrieval operation is executed. More specifically, an operator uses the dialling keys to input a code corresponding to the abbreviated name, in which a two-digit number represents each katakana. Otherwise, an abbreviated dialling number is inputted and the retrieval operation is continued till a desired abbreviated name is displayed.

In the above directory function, the registration operation and the retrieval operation are independent of each other.

In the key telephone systems, the abbreviated dialling numbers include common abbreviated numbers registered/updated from a specific extension telephone and used commonly in the system, and individual abbreviated numbers registered/updated at each extension telephone and used from each corresponding extension telephone.

The above telephones and systems have problems as follows:
(1) To register data in the electronic directory, the data should be registered as abbreviated dialling numbers. If the number of registered data exceeds one hundred, the number of digits of abbreviated dialling numbers becomes three; if the number of data exceeds one thousand, the number of digits becomes four. Accordingly, the calling operation using an abbreviated dialling number becomes troublesome with increase of registered data.
(2) In the key telephone systems, the individual abbreviated numbers are not registered depending upon extension telephone, wasting the storage area.
(3) In the key telephone system, the common abbreviated number are used with different frequency depending upon each extension telephone. Assuming that some extension telephones register some of the common abbreviated numbers as individual abbreviated numbers which are easier for the user to memorize, the same data are registered at the extension telephones, degrading maintenability.
(4) In case where the storage area of the common abbreviated numbers is full, many extension telephones have to register the same data as individual abbreviated numbers. The registration operations requires time and memory spaces.

SUMMARY OF THE INVENTION

The present invention has been made in consideration of the above situation, and has as its object to provide a telephone having a user-friendly electronic directory. The directory allows an user to register all necessary data with easy operations. Further, the number of digits of abbreviated dialling numbers is fixed regardless of the number of registered data.

Another object of the present invention is to provide a user-friendly key telephone system in which an electronic directory in a main unit can be easily utilized from respective extension telephones, and a common abbreviated number function and an individual abbreviated number function are effectively employed.

According to the present invention, the foregoing object is attained by providing a telephone having electronic directory function comprising first memory means for storing an abbreviated name and a dialling number in a state that the abbreviated name is corresponding to the dialling number, second memory means for storing correspondence between an abbreviated number and the dialling number, retrieval means for retrieving the dialling number stored in said first memory means with the abbreviated name and registration means for registering the dialling number retrieved by said retrieval means into said second memory means in a state that the retrieved dialling number is corresponding to the abbreviated dialling number.

The invention is particularly advantageous since data more than the number of digits of abbreviated numbers can be registered in the electronic directory, further, both abbreviated dialling number data and abbreviated name data can be employed upon retrieval. By this arrangement, the present invention can provide a large-scale electronic directory which allows quick retrieval of a frequently-used data and retrieval of all registered data without lowering calling operativity by abbreviated dialling.

According to the present invention, abbreviated dialling data can be registered during retrieval operation, further improving operativity of the electronic directory.

The electronic directory is separated into an electronic directory data and an index for each extension telephone so that data maintenance can be uniquely managed and the maintenability can be improved. Each extension can define data with arbitrary abbreviated numbers, thus the operativity can be improved.

In each extension, a storage area for individual abbreviated numbers is not fixed, accordingly, the directory data can be registered within allowable range of RAM capacity regardless of presence/absence of individual abbreviated numbers.

Further, the present invention can provide a large-scale electronic directory which allows registration of abbreviated dialling numbers during retrieval and easily forms common abbreviated number data and individual abbreviated number data. The directory allows quick retrieval of registered data of high usage and retrieval of all the registered data without lowering calling operativity by abbreviated dialling.

According to the present invention, a data registered from an arbitrary extension telephone is managed by a specific extension telephone, improving data maintenability.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

Figure 1:
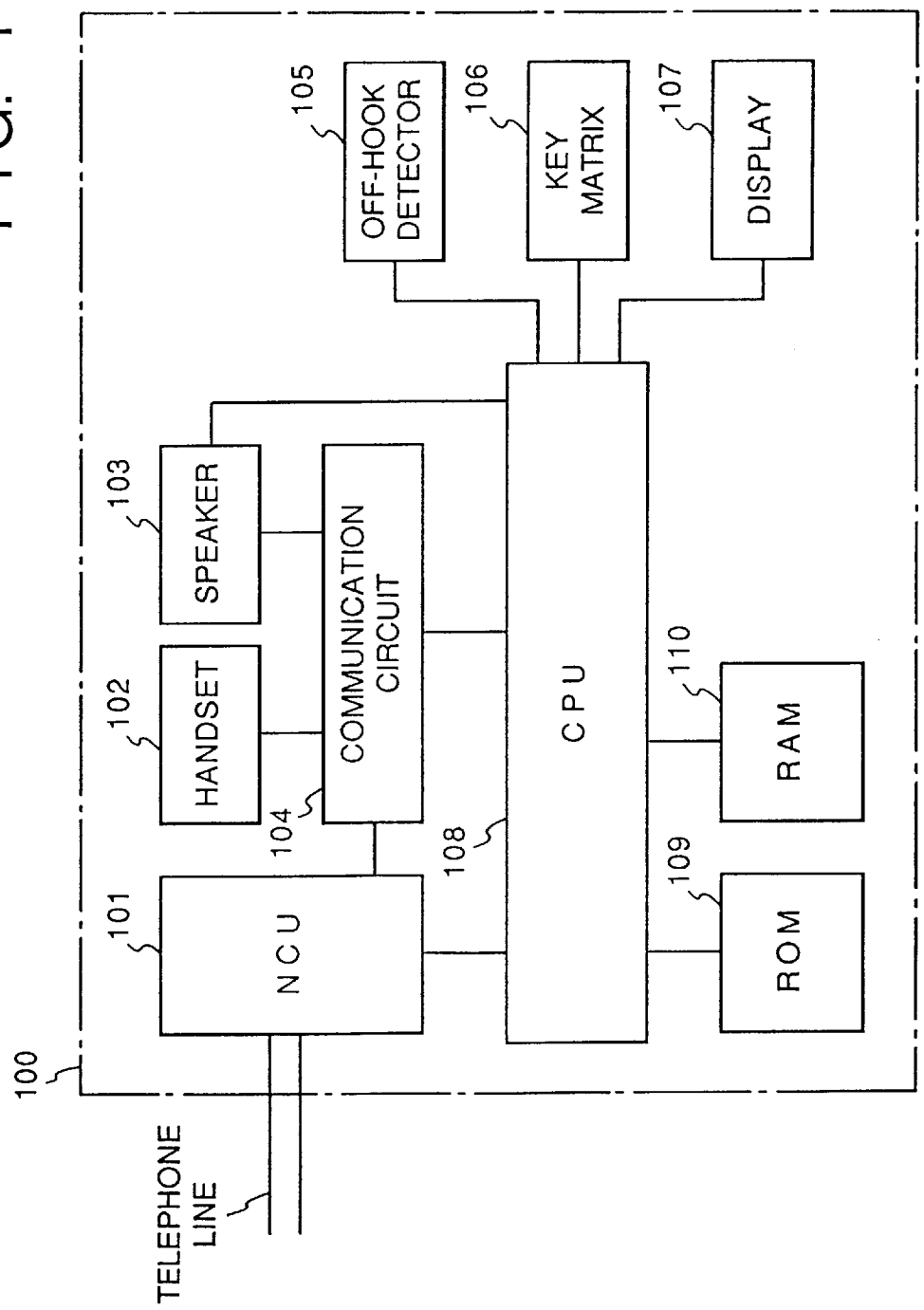
FIG. 1 is a block diagram showing a configuration of a telephone according to an embodiment of the present invention.

FIG. 1 shows a configuration of a telephone 100 according to an embodiment of the present invention.

The telephone 100 has electronic directory function, and it includes a network control unit (NCU) 101, a handset 102 for communication, a speaker 103 for generating tones such as incoming-call tone, a communication circuit 104, an off-hook detector 105 for detecting the calling and disconnecting operations, a key matrix 106 having such as dialling keys, a display 107 for displaying such as the contents of the directory, a CPU 108 for controlling the overall apparatus, a ROM 109 in which data such as control programs and fixed data are stored, and a RAM 110 for storing directory data. The NCU 101 detects an incoming call from a telephone line network, opens and closes a line in accordance with calling and disconnecting operations, and transmits a dialling data. The communication circuit 104 switches over the destination of sound (e.g. the speaker 103) from a telephone line or the source of sound (e.g. the handset 102) to the telephone line.

Figure 2:
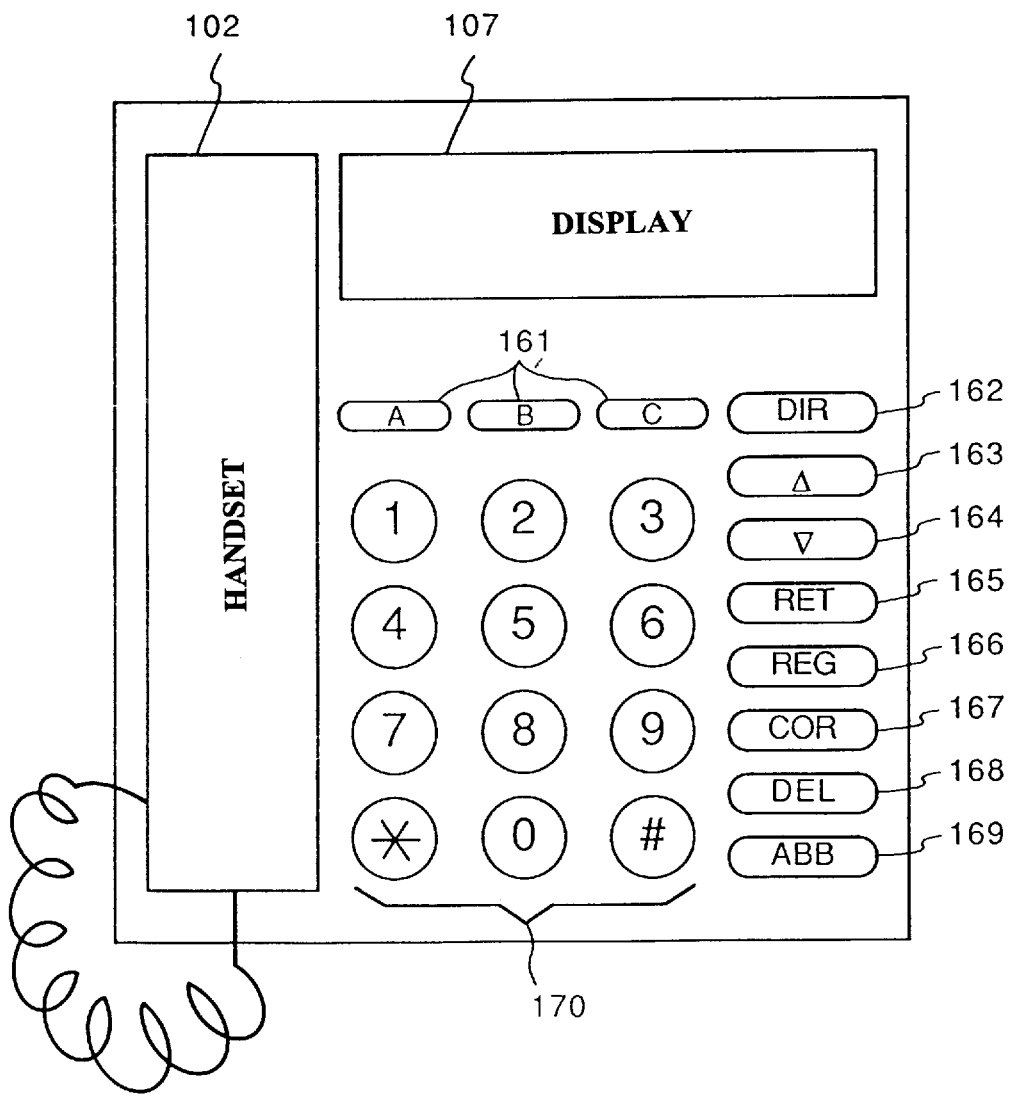
FIG. 2 is a plan view showing an external appearance of the telephone.

FIG. 2 illustrates an external appearance of the telephone 100.

The telephone 100 has single-touch keys 161, a directory ("DIR" in the drawings) key 162 for initiating a process using the directory, a ascending-retrieval ("Δ" in the drawings) key 163 for designating ascending retrieval, a descending-retrieval ("∇" in the drawings) key 164 for designating descending retrieval, a retrieval ("RET" in the drawings) key 165 for instructing data retrieval of the electronic directory, a registration ("REG" in the drawings) key 166 for instructing registration of data for the directory and abbreviated dialling numbers, a correction ("COR" in the drawings) key 167 for instructing correction of directory data and abbreviated dialling number data, a delete ("DEL" in the drawings) key 168 for instructing data deletion, an abbreviation ("ABB" in the drawings) key 169 for initiating an abbreviated dialling operation (an speed dialling operation) and ten keys 170 including an asterisk key (*) and a sharp key (#).

FIGS. 3 to 6 illustrate the respective memory blocks constituting the electronic directory in the RAM 110.

Figure 3:
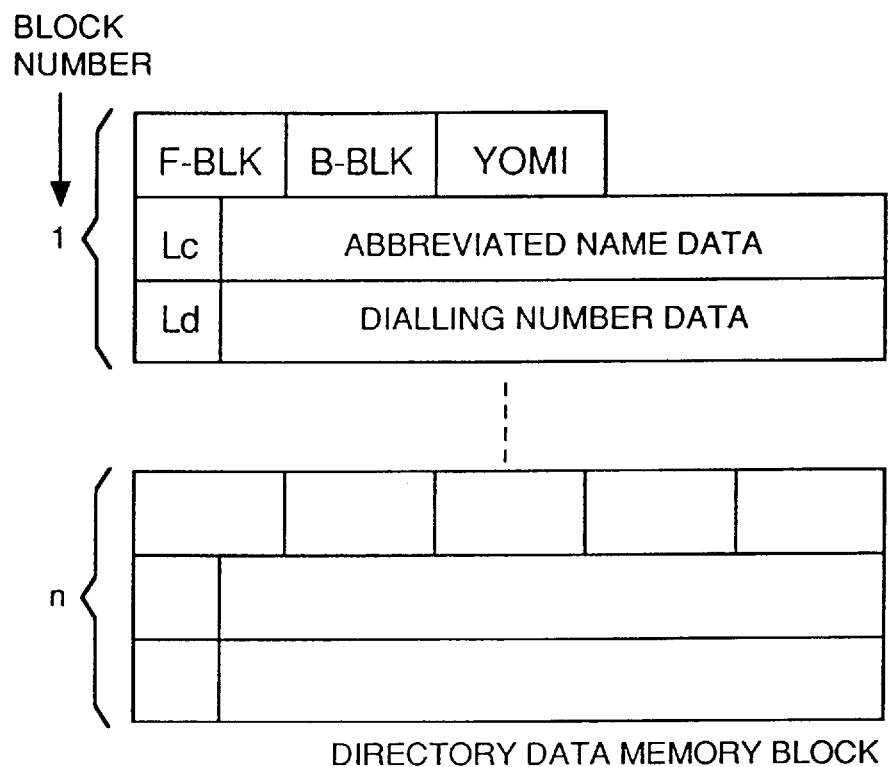
FIG. 3 is a diagram showing a directory data memory block of the telephone.

FIG. 3 shows the structure of a directory data memory block ("DIR MEM" in the drawings) constituting the electronic directory on the RAM 110. In FIG. 3, one block corresponding to one data includes an input dialling data ("DIA DATA" in the drawings), an abbreviated name data (a name data for an abbreviated dialling operation or an speed dialling operation) ("ABB NAME" in the drawings), data length Ld of the dialling data and data length Lc of the abbreviated name data, a data YOMI indicative of reading (pronunciation) of the abbreviated name data, which is specified upon inputting of abbreviated name data, a front block pointer F-BLK and a back block pointer B-BLK determined with results from sorting of YOMI data in syllabary order. In this embodiment, the blocks are numbered from one to n (n>99).

Figure 4:
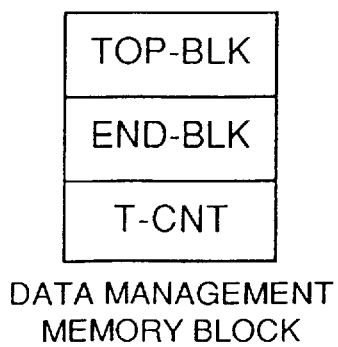
FIG. 4 is a diagram showing a data management memory block of the telephone.

FIG. 4 shows the structure of a data management memory block ("MAN MEM" in the drawings) for managing the directory data memory blocks. The data management memory block comprises a top block pointer TOP-BLK in which a block number of the top directory data determined from the syllabary order sorting results is stored, an end block pointer END-BLK in which a block number of the last directory data also determined from the syllabary order sorting results, and a T-CNT in which a total number of blocks in use is stored.

Figure 5:
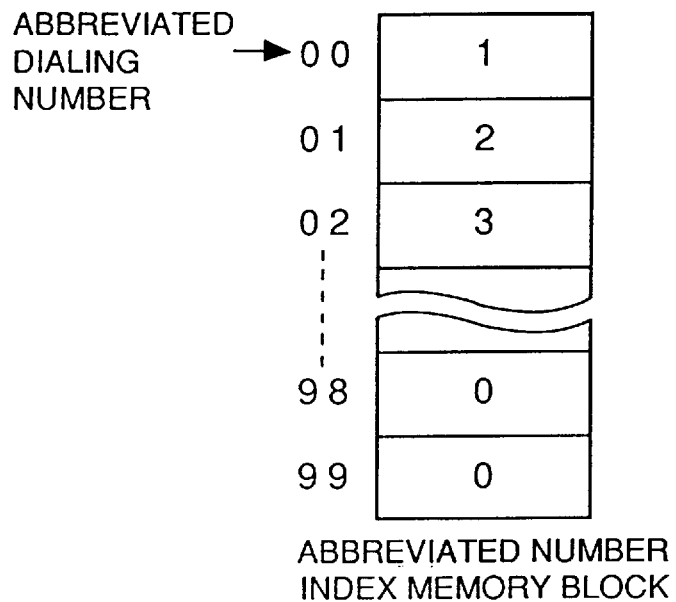
FIG. 5 is a diagram showing an abbreviated number index memory block of the telephone.

FIG. 5 illustrates the structure of an abbreviated number index memory block ("ABB MEM" in the drawings) in which block numbers of directory data corresponding to abbreviated numbers are stored. In FIG. 5, data such as a dialling data corresponding to an abbreviated dialling number ("ABB NO" in the drawings) "00" are stored in a block 1. Similarly, data corresponding to each of abbreviated numbers "01" and "02" are respectively stored in blocks 2 and 3. Blocks of abbreviated numbers "98" and "99" are both numbered zero, which means no data are stored in these blocks.

Figure 6:
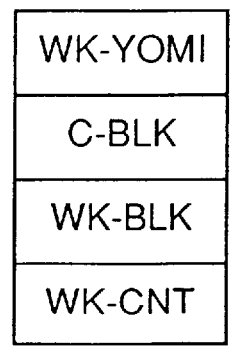
FIG. 6 is a diagram showing a work memory block of the telephone used at data registration/retrieval time.

FIG. 6 illustrates the structure of a working memory block employed temporarily upon data registration and data retrieval processes. Each area is named to be used thereinafter.

When the system is started, all the directory data memory blocks are cleared with (00)h. In the data management memory block, the values of TOP-BLK and END-BLK are set to one and the value of the T-CNT is set to zero. All the abbreviated number index memory blocks and the working memory blocks are cleared with (00)h.

Figure 7:
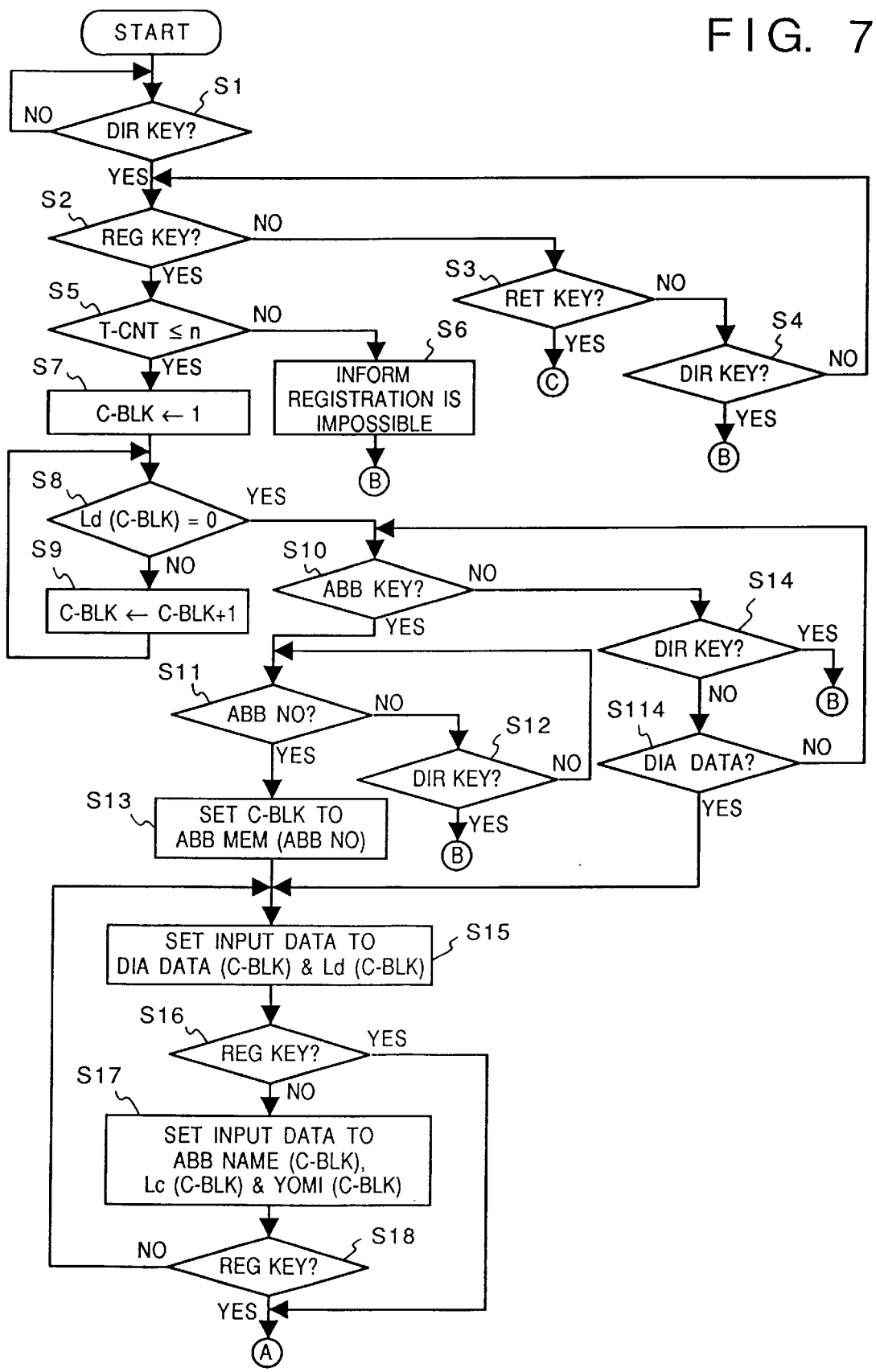
FIGS. 7 and 8 are flowcharts showing data registration operation in the telephone.
Figure 8:
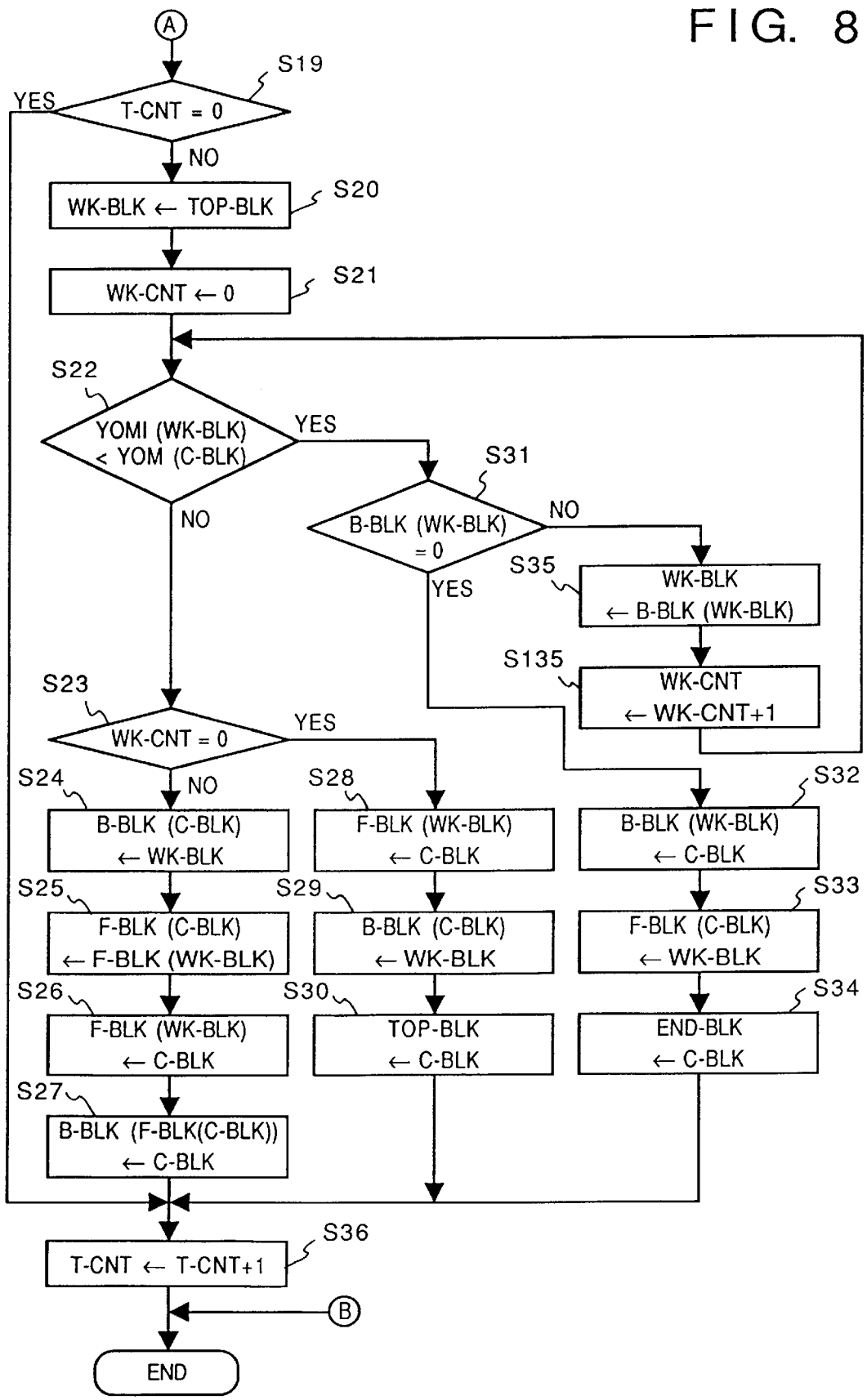

Next, the directory data registration process by the CPU 108 will be described with reference to FIGS. 7 and 8.

First, whether the directory key 162 for instructing start of operating the electronic directory is pressed or not is monitored in step S1, and if YES, in step S2, whether the registration key is pressed or not is monitored, in step S3, whether the retrieval key is pressed or not is monitored, further, in step S4, whether the operation is terminated or not is monitored.

In step S2, if the registration key 166 is pressed, the value of the T-CNT indicating the total number of blocks in use is compared with the number of whole blocks (=n) to determine there are available blocks in step S5. If NO, indication such as a message informing that registration is impossible is displayed on the display 107 in step S6, thereafter, the process ends.

If YES in step S5, the searching operation for an available block follows. In step S7, the block number "1" is set to the C-BLK, and whether the dialling data length Ld of the block is zero or not is checked in step S8. If the block number is not zero, a dialling data is already stored, i.e., the block is in use. In this case, the value of the C-BLK is incremented by one in step S9 and the process returns to step S8.

If an available block is found in step S8, whether the abbreviation key 169 is pressed or not is monitored in step S10, the abbreviation key 169 is pressed, an input of a two-digit abbreviated dialling number is waited in step S11. If the directory key 162 is pressed before the input of the abbreviated number in step S12, it is determined that the registration is interrupted, and the process ends.

In step S11, when the input of two-digit abbreviated number is detected, the value of the C-BLK is set to a position in the abbreviated number index memory block corresponding to the abbreviated dialling number in step S13.

If the directory key 162 is pressed before the abbreviation key 169 is pressed in step S10, the process ends at the time.

If a dialling number data is inputted with the ten keys 170 before the abbreviated key 169 is pressed in step S114, the input dialling number data and its data length Ld are entered in the block indicated by the C-BLK in step S15.

If the registration key 166 is pressed in step S16, the input of the dialling number data is terminated.

Further, if the registration key 166 is not pressed and an abbreviated name data and its reading are inputted in accordance with a predetermined code list (in this embodiment, the input of abbreviated name data is detected by input of the asterisk (*)), the input abbreviated name data, its data length Lc and the reading of the name are entered in the data block indicated by the C-BLK in step S17.

It should be noted that an abbreviated name data includes a kanji (Chinese character) code, and that a reading is a kana (Japanese syllabary) code. Kana codes are prepared in numerical order. For example, "ア" (the first syllabary) is represented by "*01"; "イ" (the second syllabary), by "*02", . . . . Similarly, a kanji code or an alphabet code are in numerical order so that the values become larger along with syllabary order or alphabetical order.

The process of steps S15 and S17 are continued till it is detected that the registration key 166 is pressed in step S18. When the press of the registration key 166 is detected in either of steps S16 or S18, it is determined that the data input is completed and sorting operation in accordance with the input reading (YOMI) is started.

In step S19, the value of the T-CNT indicative of total number of blocks in use is checked. If the value is zero, it is not necessary to connect a pointer chain since the data is first registered this time. Accordingly, the T-CNT value is incremented by one in step S34 and the process ends.

If the T-CNT value is not zero, the pointer chain is connected to the block. First, a value of the TOP-BLK is set to a WK-BLK indicating a block number to be compared in step S20, next, a value of a counter WK-CNT which counts comparison is set to zero in step S21, and the YOMI in the current block and a YOMI in a block in-use indicated by the WK-BLK are compared in step S22.

As the comparison result, if the value of the current block is larger, the block should be the latter in the sorting order. The process proceeds to step S31, in which, if the B-BLK value is not "0", the WK-BLK value is updated to the next block value (B-BLK) in the sorting order in step S35, the WK-CNT value is incremented by one in step S135.

In step S31, if the value of the B-BLK of the block indicated by the WK-BLK is zero, i.e., the block is the last one, the current block is connected after the end of the pointer chain. More specifically, the B-BLK value of the block indicated by the WK-BLK is set to the the C-BLK value in step S32, and the F-BLK of the current block is set to the WK-BLK value in step S33.

Next, the value of the C-BLK is set to the END-BLK in step S34, and the value of the T-CNT is incremented by one in step S36, thereafter, the process ends.

In step S22, if the value of the current block is not larger as a comparison result, the block should be the former in the syllabary sorting order. In this case, the value of the WK-CNT is checked in step S23, and if the value is zero, i.e., the block should be connected at the head of the pointer chain, the value of the C-BLK is set to the F-BLK of the block indicated by the WK-BLK in step S28, and the value of the WK-BLK to the B-BLK of the block indicated by the C-BLK in step S29. In step S30, the value of the C-BLK is set to the TOP-BLK indicating the head of the pointer chain, and the value of the T-CNT is incremented by one in step S36. Thereafter, the process ends.

In step S23, if the value of the WK-CNT is not zero, the current block should be connected between the both ends of pointer chain, and the block indicated by the WK-BLK is connected after the current block. Consequently, the value of the WK-BLK is set to the B-BLK of current block in step S24, the value of the F-BLK of the block indicated by the WK-BLK is set to the F-BLK of current block in step S25, the value of the C-BLK is set to the F-BLK of the block indicated by the WK-BLK in step S26. Further, the value of the C-BLK is set to the B-BLK of the block connected before the current block i.e. the block the value of which is stored in the F-BLK of current block in step S27, and the value of the T-CNT is incremented by one in step S36. Thereafter, the process ends.

In a manner as described above, the pointer chain is made by sorting blocks in syllabary order and connecting the current block, and the registration operation is terminated.

Figure 9:
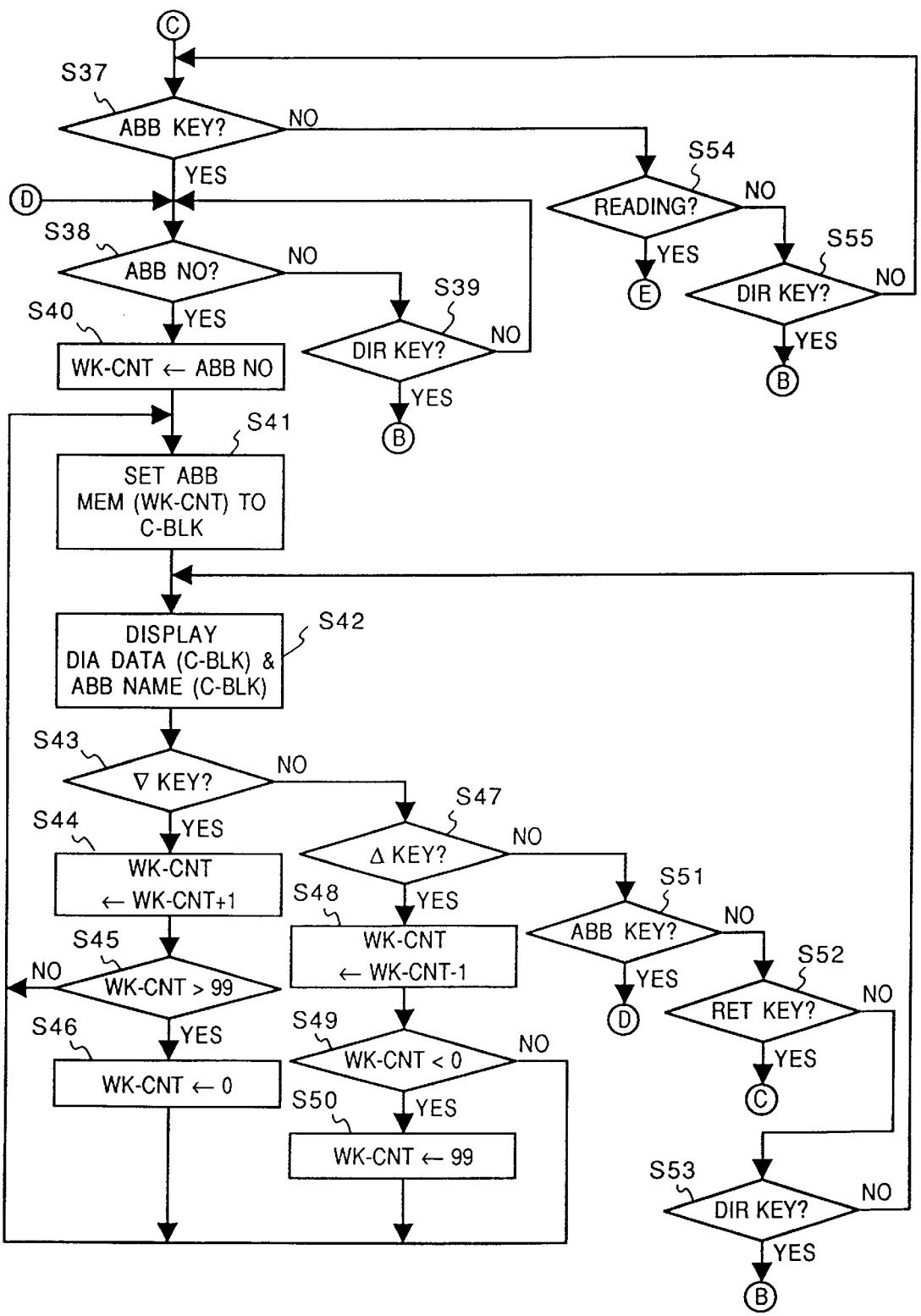
FIGS. 9 to 11 are flowcharts showing data retrieval operation in the telephone.
Figure 10:
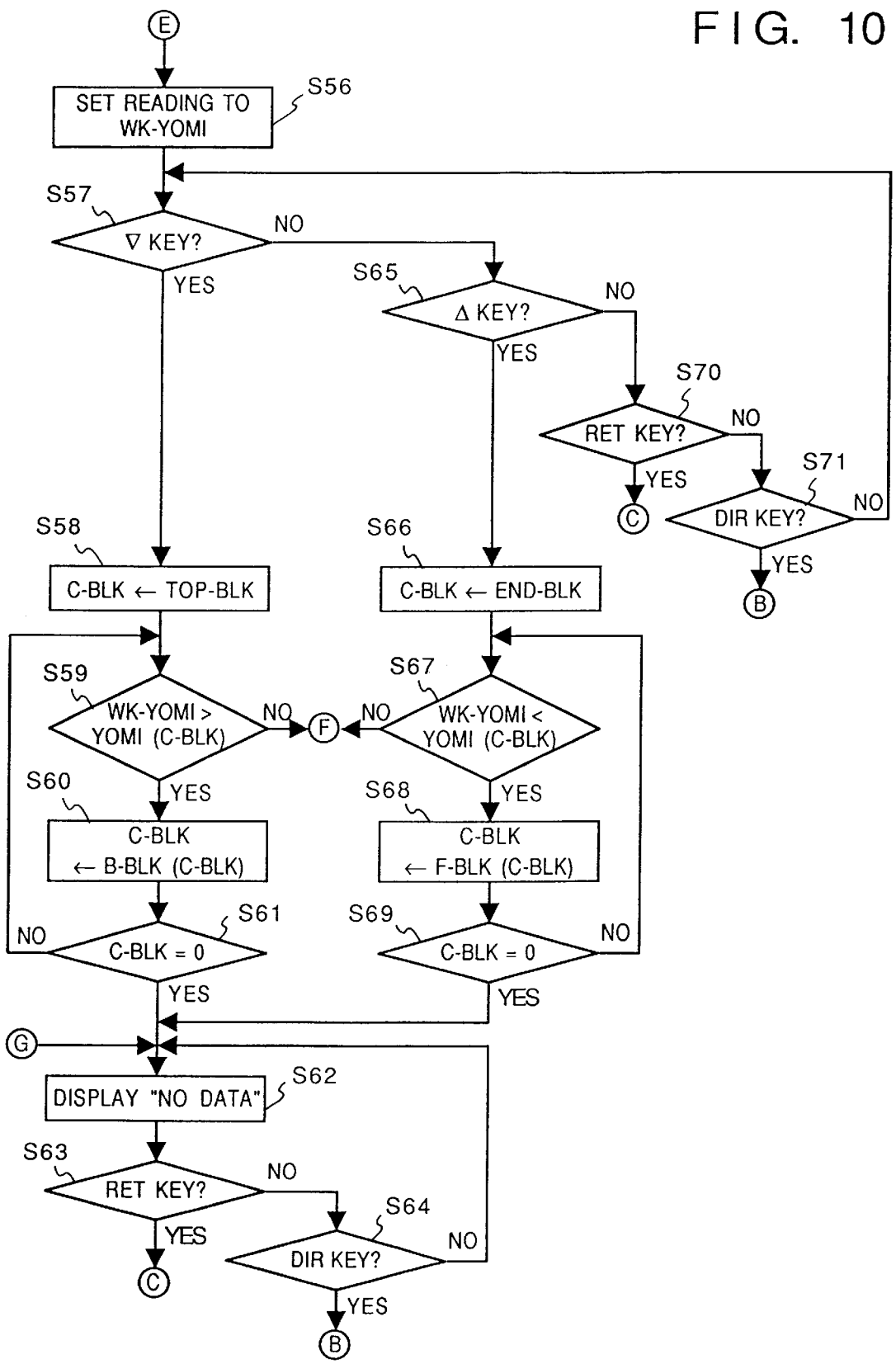

Next, the directory retrieval operation in case where the retrieval key 165 is pressed in step S3 will be described with reference to FIGS. 9 to 11.

First, if the abbreviation key 169 is pressed in step S37, an input of a two-digit abbreviated dialling number is waited to perform the retrieval with the abbreviated dialling number in step S38. If the directory key 162 is pressed before the input of the abbreviated dialling number in step S39, it is determined that the retrieval is interrupted, and the operation is terminated.

If a two-digit abbreviated dialling number is inputted, the input abbreviated dialling number is set to the WK-CNT in step S40, and a block number in a position of the abbreviated number index memory block corresponding to the abbreviated dialling number is set to the C-BLK in step S41.

In step S42, a dialling number data and an abbreviated name data indicated in the block indicated by the C-BLK are displayed on the display 107. If the descending-retrieval key 164 is pressed while the data are displayed in step S43, the value of the WK-CNT is incremented by one in step S44. In step S45, if the WK-CNT value becomes larger than ninety-nine, it is cleared to zero in step S46. The process returns to step S41 to display the contents of corresponding block.

In step S47, if the ascending-retrieval key 163 is pressed during the display of step S42, the WK-CNT value is decremented by one in step S48. If the value becomes smaller than zero as the lower limit value of abbreviated number in step S49, the value is set to ninety-nine in step S50. The process also returns to step S41 to display the contents of corresponding block.

In step S51, if the abbreviation key 169 is pressed during the display of step S42, the process returns to step S38 to wait for an input of abbreviated dialling number and repeat the above-described operations. In step S52, if the retrieval key 165 is pressed, the process returns to step S37 to wait for instruction of retrieval method. If the directory key 162 is pressed in step S53, the retrieval operation is terminated.

If the abbreviation key 169 is not pressed in step S37 but a reading of abbreviated name data is inputted in step S54, the retrieval operation with the reading is performed in step S56 and the subsequent steps. If the directory key 162 is pressed in step S55, the retrieval operation is terminated.

First, the input reading data is set to the WK-YOMI in step S56. If the descending-retrieval key 164 is pressed in step S57, the value of the TOP-BLK is set to the C-BLK for retrieval from the top of directory data memory blocks in step S58. In step S59, the value of the WK-YOMI and the value of the YOMI in a data block indicated by the C-BLK are compared.

If the value of the WK-YOMI is larger, the value of the C-BLK is updated to the value of the B-BLK of the block indicated by the C-BLK in step S60. If the updated value of the C-BLK is zero, i.e., the comparison to the end block is completed in step S61, the process proceeds to step S62, in which indication such as a message informing that there is no corresponding data is indicated on the display 107.

If the retrieval key 165 is pressed in step S63, the process returns to step S37, and if the directory key 162 is pressed in step S64, the retrieval operations is terminated.

In step S61, if the value of the C-BLK is not zero, the operations from step S59 to step S61 are repeated. If the value of the WK-YOMI is not larger than the value of the YOMI in the block indicated by the C-BLK, process proceeds to step S72 to display the data of a corresponding block on the display 107.

If the descending-retrieval key 164 is not pressed in step S57 but the ascending-retrieval key 163 is pressed in step S65, the value of the END-BLK is set to the C-BLK to perform the retrieval from the end block of the directory data blocks in step S66, and the value of the WK-YOMI and the value of the YOMI in a block indicated by the C-BLK are compared in step S67.

If the value of the WK-YOMI is smaller, the value of the C-BLK is updated to the value of the F-BLK of the block indicated by the current C-BLK in step S68. If the updated C-BLK value is zero, i.e., the comparison to the top data block is completed in step S69, the process proceeds to step S62 to display indication such as a message informing that there is no corresponding data.

If the value of the C-BLK is not zero in step S69, the operations from step S67 to step S69 are repeated. If the value of the WK-YOMI is not smaller than the value of the YOMI of the block indicated by the C-BLK, the process proceeds to step S72 to display the data of a corresponding block.

In step S73, if the abbreviation key 169 is pressed during the display of step S72, an input of a two-digit abbreviated dialling number is waited in step S74. If the abbreviated dialling number is inputted, the value of the C-BLK is set to a position in the abbreviated number index memory block corresponding to the abbreviated number in step S75. Thereafter, the process returns to step S72. In this manner, the data being currently displayed is registered as an abbreviated dialling number.

While the corresponding data is displayed in step S72, if the descending-retrieval key 164 or the ascending-retrieval key 163 is pressed in step S76 or step S79, the value of the C-BLK is updated in the above-described manner and the contents of the block according to the pointer chain is displayed in steps S77 to S78 or steps S80 to S81. If the retrieval key 165 is pressed in step S82, the process returns to step S37 to wait for instruction of retrieval method. If the directory key 162 is pressed in step S83, the retrieval is regarded as terminated, and the process ends.

In step S70, if the retrieval key 165 is pressed after the input of the reading of step S56, the process returns to step S37 to wait for instruction of retrieval method. If the directory key 162 is pressed in step S71, the retrieval is regarded as completed and the process ends.

Figure 11:
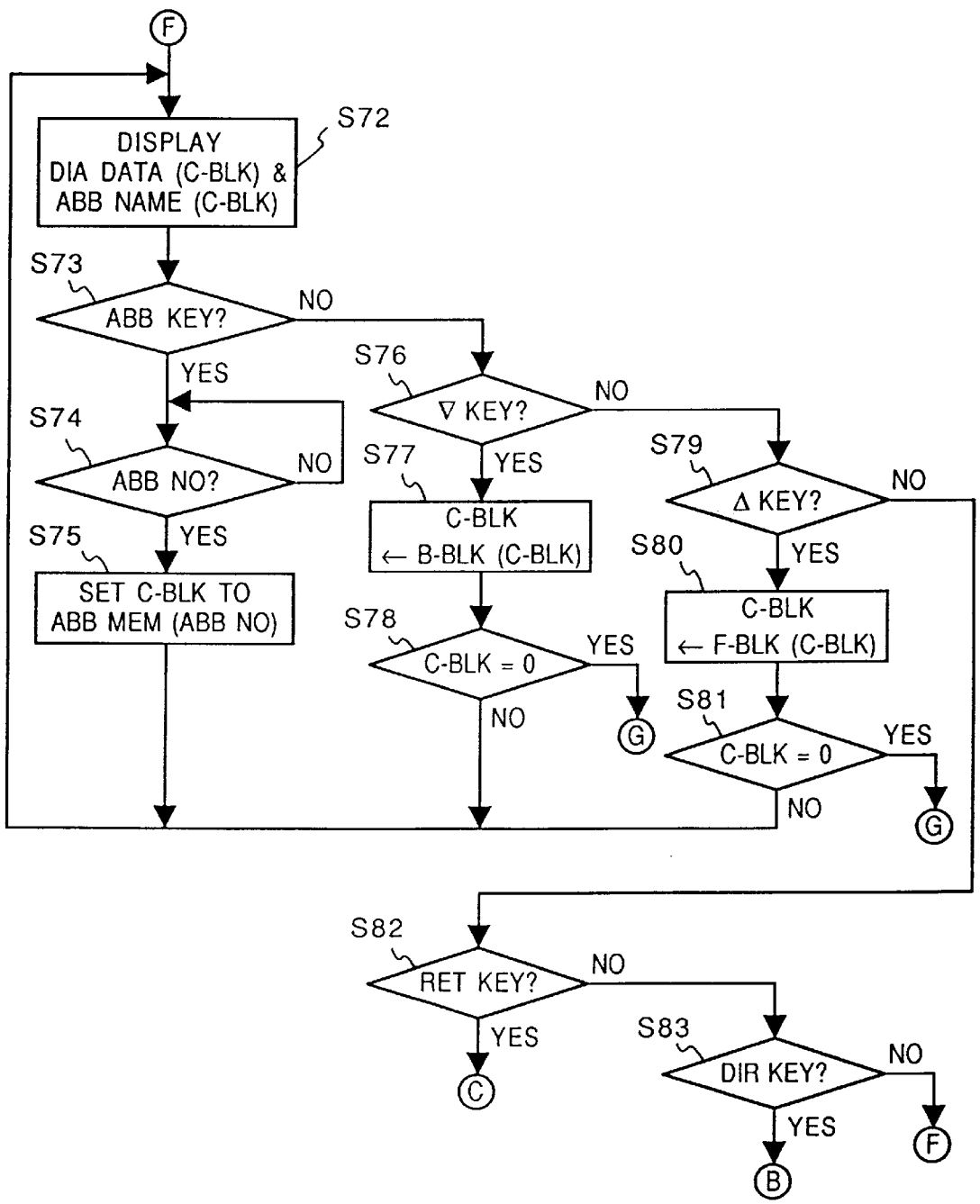
Figure 12:
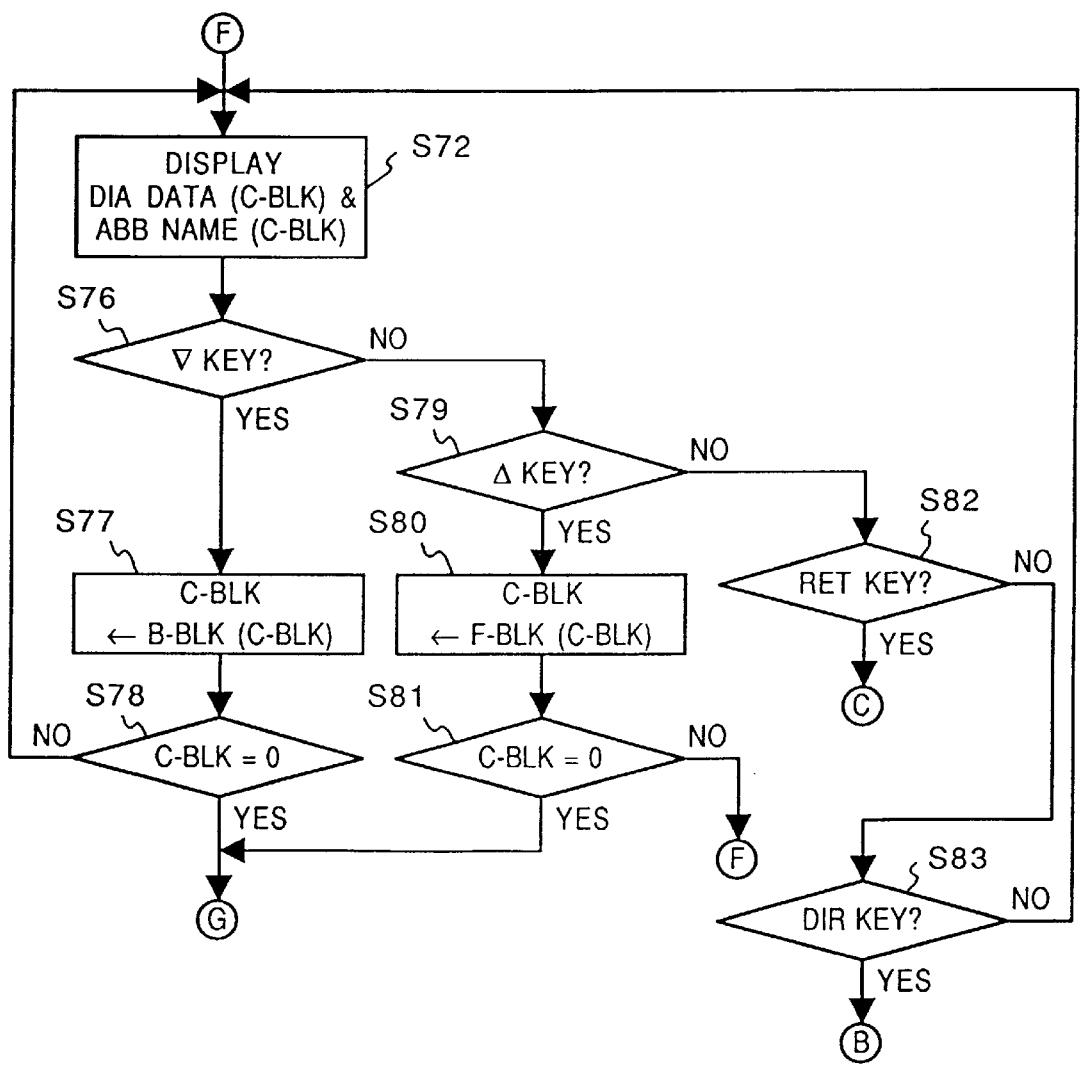
FIG. 12 is a flowchart showing a modification to the data retrieval operation in FIG. 11.

FIG. 12 is a flowchart showing a modification to the flowchart of FIG. 11.

In the flowchart as shown in FIG. 12, the retrieval function in steps S73 to S75 of FIG. 11 in which a registered data is retrieved as a directory data and it is re-registered as an abbreviated dialling number data is omitted. In this modification, either of retrieval with an abbreviated dialling number and retrieval by an input of an abbreviated name is selected so that the abbreviated dialling number data and the directory data are dealt separately. As shown in FIG. 12, the operations except the omitted steps S73 to S75 are similar to those in FIG. 11 and therefore the explanations of the corresponding operations will be omitted.

In this modification, the number of directory data can be increased without increasing the number of digits of abbreviated dialling number, since the abbreviated dialling data and the directory data are treated separately upon registration and retrieval operations.

Accordingly, the modification can provide easy dialling operation using an abbreviated dialling number with a small number of digits. Further, inputs of unnecessary abbreviated names can be omitted. On the other hand, the modification allows a user to freely register many destination data in the directory, improving the use of the telephone.

In the above embodiment and modification, the directory data block includes YOMI for reading data in consideration of a case where an abbreviated name has plural readings. For example, if an abbreviated name data to be displayed in kanji (Chinese character) is "谷津" (this name has two way of readings), its reading automatically becomes "タニツ(tanitsu)" in accordance with a conversion dictionary. If the actual reading is "ヤツ (yatsu)", the reading is manually inputted as a reading data. However, if it is arranged such that the display unit does not display the kanji characters, the YOMI in the directory data block is not necessary, and a pointer chain can be formed by directly comparing the abbreviated name data.

Further, a single-touch dialling index memory block can be employed in place of the abbreviated number index memory block, in this case, registration and retrieval operations by similar process to those in the above embodiments are possible.

In the registration operation in which an abbreviated dialling number is specified in the above embodiments, if the specified abbreviated dialling number is already registered, the content of the abbreviated dialling number index memory block is changed to a number of empty block but the directory data block is kept unchanged. The new data which is retrievable with both the abbreviated number and abbreviated name is added to the directory, and the initial data is not deleted and is retrievable with only its abbreviated name.

In the above embodiments, the keys 162 to 169 for the respective operations are arranged on the telephone as fixed special-function keys, however, the operations can be made by specific input using dialling keys.

Figure 13:
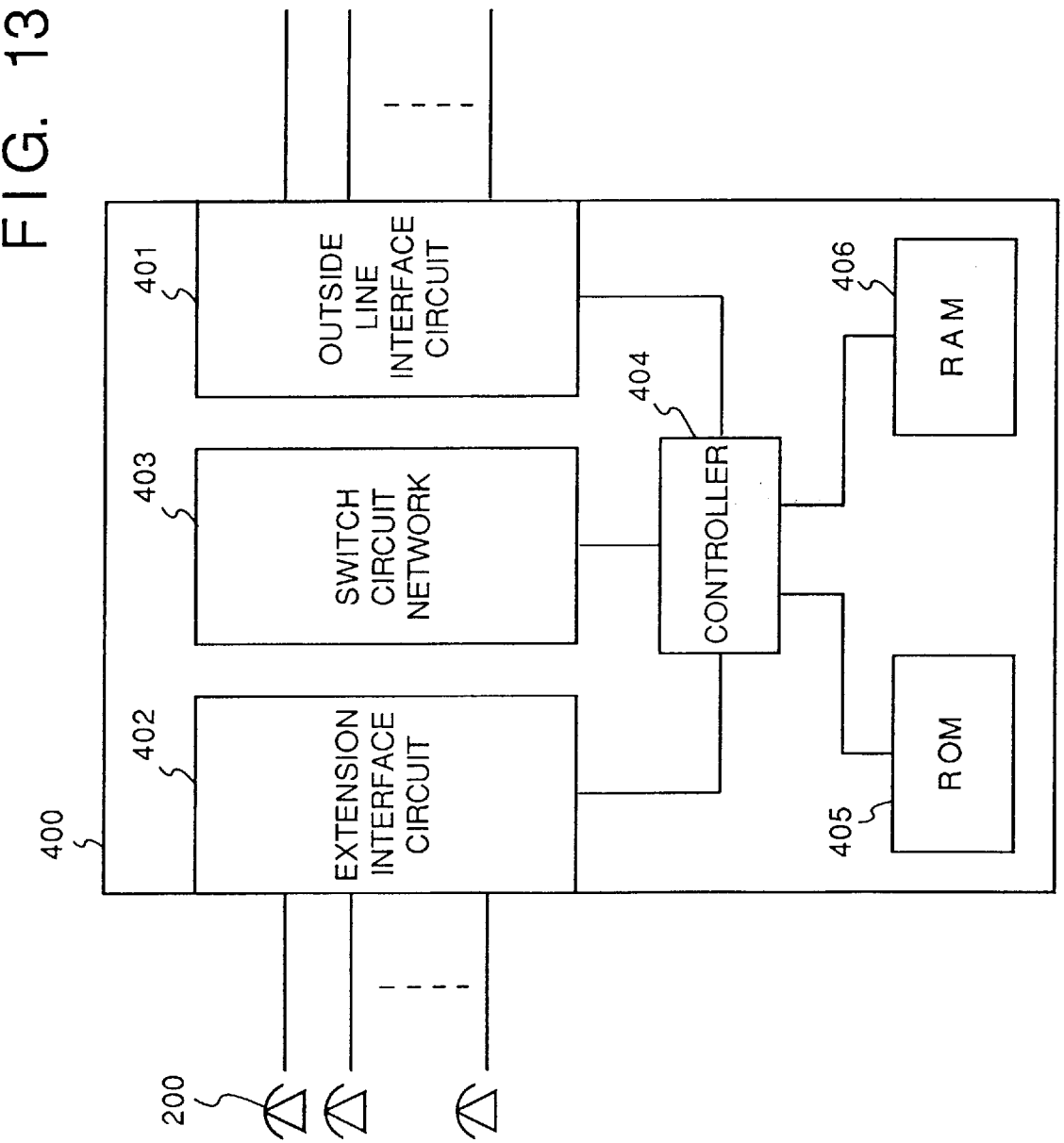
FIG. 13 is a block diagram showing a configuration of a key telephone system according to another embodiment of the present invention.

FIG. 13 shows a configuration of a key telephone system according to another embodiment.

A main unit 400 of this system has an electronic directory function, and it comprises an outside line interface circuit 401 for detecting an incoming-call from an telephone line network and performing calling and dialling data transmission operations, an extension interface circuit 402 for interfacing the main unit 400 and extensions 200, a switch circuit network 403 for connecting outside lines with the extensions or connecting the extensions, a controller 404 for controlling the overall system, a ROM 405 in which programs for controlling the system are stored and a RAM 406 in which data such as directory data are stored.

It should be noted that the external appearance of extension 200 corresponds to the telephone 100 as shown in FIG. 2.

Figure 14:
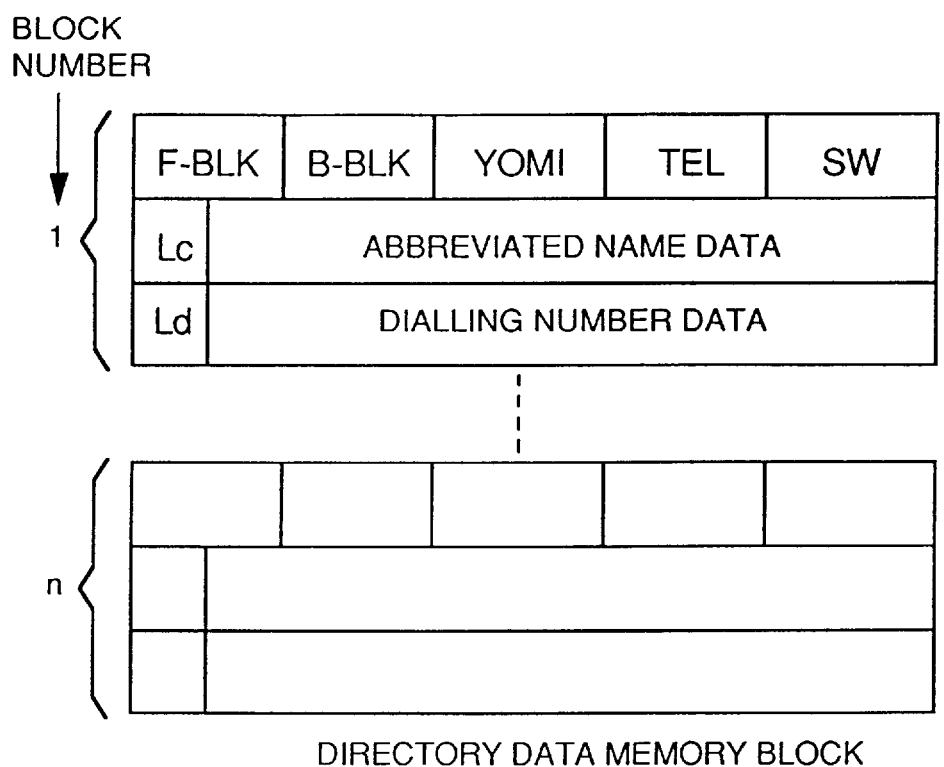
FIG. 14 is a diagram showing a directory data memory block of the system.
Figure 15:
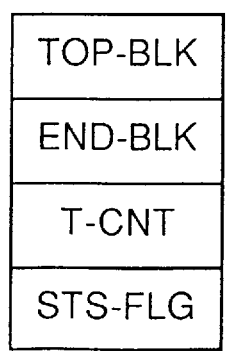
FIG. 15 is a diagram showing a data management memory block of the system.
Figure 16:
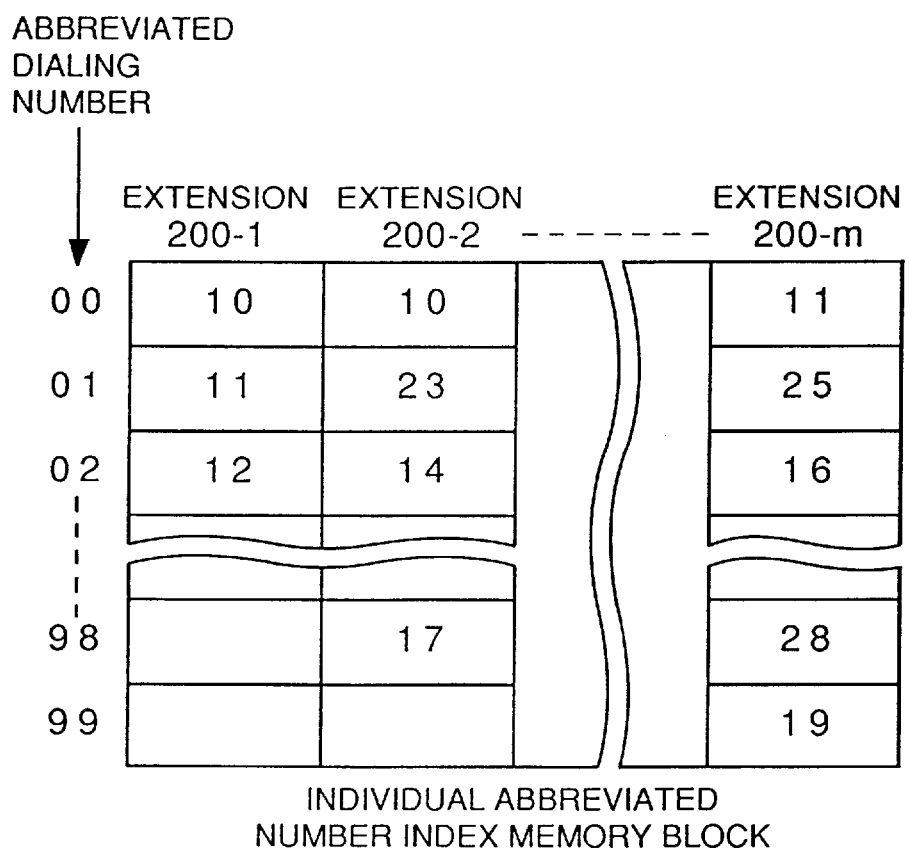
FIG. 16 is a diagram showing an individual abbreviated number index memory block of the system.

FIGS. 14 to 16 illustrate respective memory blocks constituting the electronic directory in the RAM 406.

FIG. 14 shows the structure of a directory data memory block. In FIG. 14, one block representing one directory data includes an input dialling number data and a corresponding abbreviated name data, data lengths Ld and Lc of the respective data, a reading data YOMI specified upon inputting of the abbreviated name data, a front block pointer F-BLK and a back block pointer B-BLK determined with results from a sorting in syllabary order, a TEL indicative of an extension which registered data into the block and a SW in which access right information for access to the directory data block is stored.

FIG. 15 shows the structure of a data management memory block for managing the directory data memory block. The data management memory block includes a TOP-BLK in which a block number of the top block determined from the syllabary order sorting results of YOMI data, an END-BLK in which a block number of the last block also determined from the sorting results is stored, a T-CNT in which a total number of blocks in use is stored and a STS-FLG indicative of an extension number updating a block is stored, and indicative of whether the block is used or not.

FIG. 16 shows the structure of an individual abbreviated number index memory block ("IND ABB MEM" in the drawings) in which block numbers are stored corresponding to abbreviated dialling numbers of each extension unit. In FIG. 16, data of an abbreviated dialling number ("ABB NO" in the drawings) "00" of an extension ("EXT" in the drawings) 200-1 are stored in a block 10 which is one of the directory data blocks as shown in FIG. 14. Similarly, data of abbreviated dialling numbers "01" and "02" are stored in blocks 11 and 12. Further, no data is registered in blocks of abbreviated dialling numbers "98" and "99" of the extension 200-1.

It should be noted that a work area which the controller 404 uses upon data registration and retrieval corresponds to that as shown in FIG. 6.

Next, the directory data registration operation will be described with reference to FIGS. 17 to 20.

In step S201, whether the directory key 162 for initiating a process with the directory is pressed or not is monitored. If YES, whether the registration key is pressed or not is monitored in step S202, whether retrieval key is pressed is monitored in step S203, and whether termination of operation is instructed is monitored in step S204.

In step S202, if the registration key 166 is pressed, the value of the T-CNT and a number n indicating the total number of the blocks are compared to find whether or not there is an available block in step S205. If there is no available block, indication such as a message informing that the registration is impossible is displayed on the display 107 in step S206, then the process ends.

If there is an available block, available block searching operation follows. In step S207, a block number "1" as the first block number is set to the C-BLK, and whether the dialling data length Ld in a block indicated by the C-BLK is zero or not is checked in step S208. If it is not zero, a dialling data is already stored in the block, i.e., the block is already in use. In this case, the value of the C-BLK is incremented by one in step S209, and the process returns to step S208.

If an available block is found in step S208, whether the abbreviation key 169 is pressed or not is monitored in step S210. If YES, the process waits till a two-digit abbreviated dialling number is inputted in step S211. If the directory key 162 is pressed before the input of the abbreviated dialling number in step S212, the registration is regarded as interrupted and the operation is terminated.

In step S211, if the input of the two-digit abbreviated dialling number is detected, the value of the C-BLK is set to a position in the individual abbreviated dialling index memory block corresponding to the abbreviated dialling number inputted from an extension currently being operated in step S213.

In step S314, if a dialling data is inputted with the ten keys 170, the input dialling data and its data length Ld are entered in the block indicated by the C-BLK in step S215. If the registration key 166 is pressed in step S216, the input of dialling data is terminated.

If the registration key 166 is not pressed but an abbreviated name data and its reading data are inputted in accordance with a predetermined code list, the input abbreviated name data, its data length Lc and the reading data are registered in the block indicated by the C-BLK in step S217. The operations in steps S215 and S217 are continued till the registration key 166 is pressed in step S216 or step S218.

If the directory key 162 is pressed in step S214 or step S314 after the press of abbreviation key 169 of step S210, the input data is cancelled. More specifically, the dialling data and its data length Ld are cleared to zero in step S322, the abbreviated name data and its data length Lc are cleared to zero in step S323, and a position in the abbreviated number index memory to which the value of the C-BLK has been set is cleared to zero in step S324.

If the registration key 166 is pressed in step S216 or step S218, the data input is regarded as completed, and a sorting operation based on reading (YOMI) data is performed.

First, whether another extension is updating a directory data memory block or not is checked in step S325. The extension number which is updating the directory data memory block is stored in the STS-FLG. The process waits till the value of the STS-FLG becomes zero, i.e., the updating is completed. Thereafter, the number of the extension currently being operated is set to the STS-FLG in step S326, and the sorting operation follows.

In the sorting operation, the T-CNT in which the total number of blocks in use is stored is checked in step S219. If the value is zero, i.e., the current registration has been made as the first registration, it is not necessary to connect the block to a pointer chain. Consequently, the extension number in the STS-FLG is set to the TEL of the block indicated by the C-BLK, thus registrant information of the current block is determined in step S344.

In step S345, if "1" is inputted immediately after the press of registration key 166, the value of the SW of the block indicated by the C-BLK is set to one in step S346, while the value of the SW is set to zero if "1" is not inputted in step S347. The SW value "1" indicates that only the extension of the TEL value can refer to and update the data in the block. The SW value "0" indicates that extensions except the one of the TEL value can refer to but cannot update the data.

In step S348, the value of the T-CNT is incremented by one, then in step S349, the STS-FLG is cleared to zero, thus the registration operation is terminated.

In step S219, if the value of the T-CNT is not zero, the block is connected to the pointer chain. First, a value stored in the TOP-BLK is set to the WK-BLK indicating a block being compared in step S220. Next, the value of the WK-CNT which counts comparison is set to zero in step S221. Then, the YOMI in the block indicated by the C-BLK i.e. the current block and a YOMI in the block indicated by the WK-BLK are compared in step S222.

If the value in the current block is larger as a comparison result, the process proceeds to step S231. If the value of the B-BLK of the block indicated by the WK-BLK is not zero, the value of the WK-BLK is updated to the value of the next block in the sorting order in step S235, and the value of the WK-CNT is incremented by one in step S335.

In step S231, if the value of the B-BLK is zero, i.e., the block is the last one, the current block is connected at the end of the pointer chain. More specifically, the value of the B-BLK of the block indicated by the WK-BLK is set to the value of the current block in step S232, and the F-BLK of the current block is set to the value of the WK-BLK in step S233.

Next, the value of the C-BLK is set to the END-BLK indicating the end of pointer chain in step S234. The extension number in the STS-FLG is set to the TEL in step S344, the value of the SW is set to one in step S346, and the value of the T-CNT is incremented by one in step S348. The value of the STS-FLG is cleared to zero in step S349, thereafter, the process ends.

As a result of the comparison of step S222, if the value in the current block is not larger, the value of the WK-CNT is checked in step S223. If the value is zero, i.e., the current block is to be connected as the head of the pointer chain, the value of the C-BLK is set to the F-BLK of the block indicated by the WK-BLK in step S228, and the value of the WK-BLK is set to the B-BLK of the block indicated by the C-BLK in step S229. In step S230, the value of the C-BLK is set to the TOP-BLK. The extension number in the STS-FLG is set to the TEL in step S344, the value of the SW is set to one in step S346, and the value of the T-CNT is incremented by one in step S348. The value of the STS-FLG is cleared to zero in step S349. Thereafter, the registration operation ends.

In step S223, if the WK-CNT value is not zero, the current block is connected between the chain, and the block indicated by the WK-CNT is connected after the current block. Accordingly, the WK-BLK value is set to the B-BLK of the current block in step S224, the value of the F-BLK of the block indicated by the WK-BLK is set to the F-BLK of the current block in step S225, and the C-BLK value is set to the F-BLK of the block indicated by the WK-BLK in step S226. In step S227, the C-BLK value is set to the F-BLK of the block set in step S225, i.e., the B-BLK of the block connected before the current block. The process proceed to step S344 in which the extension number in the STS-FLG is set to the TEL, then to step S346 in which the value of the SW is set to one, and to step S348 in which the value of the T-CNT is incremented by one. The STS-FLG value is cleared to zero in step S349, thereafter, the registration operation ends.

As described above, the block chain in the syllabary order is completed after the sorting based on the reading data. Thus the registration operation ends.

FIGS. 21 to 25 are flowcharts explaining the directory retrieval by the press of the retrieval key 165.

If the abbreviation key 169 is pressed, the retrieval of abbreviated dialling numbers is performed. In this case, an input of a two-digit abbreviated dialling number is waited in step S238. If the directory key 162 is pressed before the input of abbreviated dialling number in step S239, the retrieval is regarded interrupted and the process ends.

When the two-digit abbreviated dialling number is inputted, the number is set to the WK-CNT in step S240, and a block number stored in a position of the abbreviated number index memory block corresponding to the content in the WK-CNT is set to the C-BLK in step S241.

If the SW of the block indicated by the C-BLK is one in step S355, whether the TEL of the block coincides with the extension currently being operated is checked in step S356. If NO, indication such as a message informing that the data in the block cannot be presented is indicated on the display 107 in step S357.

In step S355, if the SW value is zero, or in step S356, the TEL and the extension coincide, a dialling data and its abbreviated name data in the block is displayed on the display 107 in step S242.

In step S243, if the descending-retrieval key 164 is pressed while the data are displayed, the value of the WK-CNT is incremented by one in step S244. If the value becomes larger than ninety-nine in step S245, it is cleared to zero in step 8246. Then the process returns to step S241 to perform the above operations.

In step S247, if the ascending-retrieval key 163 is pressed during the display of step S242, the value of the WK-CNT is decremented by one in step S248. If the value becomes smaller than zero in step S249, it is set to ninety-nine in step S250, then the process returns to step S241.

In step S251, if the abbreviation key 169 is pressed while the data are displayed, the process returns to step S238 to wait for input of an abbreviated dialling number. If the retrieval key 165 is pressed while the data are displayed in step S252, the process returns to step S237 to wait for an instruction of retrieval method, and if the directory key 162 is pressed in step S253, the retrieval operation is terminated.

If the abbreviation key 169 is not pressed in step S237 but the reading of an abbreviated name is inputted in accordance with character codes from ten keys 170 in step S254, the retrieval with the reading of the abbreviated name data is performed in step S256 and the subsequent steps.

First, the input reading data is set to the WK-YOMI in step S256. If the descending-retrieval key 164 is pressed in step S257, the value of the TOP-BLK is set to the C-BLK to perform the retrieval from the top of the directory data blocks in step S258, and the value of the WK-YOMI and the value of the YOMI in a block indicated by the C-BLK are compared in step S259.

If the value of the WK-YOMI is larger, the value of the C-BLK is updated to the value of the B-BLK of the block indicated by the C-BLK in step S260. When the value of the C-BLK becomes zero, i.e., the comparison to the last block is completed in step S261, the process proceeds to step S262 in which indication such as a message informing that there is no corresponding data is indicated on the display 107.

Thereafter, the process waits till the retrieval key 165 or the directory key 162 is pressed in step S263 or step S264. If the retrieval key 165 is pressed, the process returns to step S237, while it ends if the directory key 162 is pressed.

In step S261, if the value of the C-BLK is not zero, the operations in steps S259 to S261 are repeated. If the value of the WK-YOMI is not larger than the value of the YOMI in the block indicated by the C-BLK, the process proceeds to step S381 to determine whether the corresponding block can be displayed or not.

If the value of the SW of the block is one, whether the TEL coincides with the number of the extension currently being operated is checked in step S382. If NO, the process returns to step S260 in which the value of the C-BLK is updated. If the SW is zero or the TEL and the number of the extension currently being operated coincide, a dialling data and its abbreviated name data in the corresponding block are displayed on the display 107 in step S256.

Further, if the descending-retrieval key 164 is not pressed in step S257 but the ascending-retrieval key 163 is pressed in step S265, the value of the END-BLK is set to the C-BLK to perform the retrieval from the end of the directory data blocks in step S266, and the value of the WK-YOMI and the value of the YOMI in a block indicated by the C-BLK are compared in step S267.

If the value of the WK-YOMI is smaller, the value of the C-BLK is updated to the value of the F-BLK of the block indicated by the C-BLK in step S268. If the updated value of C-BLK is zero, i.e., the comparison to the head of the blocks is completed in step S269, the process proceeds to step S262 to display such as a message informing that there is no corresponding data on the display 107.

If the value of the C-BLK is not zero, the operations in steps S267 to S269 are repeated. When the value of the WK-YOMI is not smaller than the value of the YOMI in a block indicated by the C-BLK, the process proceeds to step S388 to determine whether the corresponding block can be displayed or not.

If the value of the SW is one, whether the TEL coincides with the extension currently being operated is checked in step S389. If NO, the process returns to step S268 to update the value of the C-BLK. If the value of the SW is zero or the TEL and the extension coincide, a dialling data and its abbreviated name data in the corresponding block are displayed in step S256.

During the display of step S256, if the ascending-retrieval key 163 or the descending-retrieval key 164 is pressed in step S257 or step S265, the value of the C-BLK is updated similarly to the above operation to display data in accordance with the pointer chain in steps S260 and S261, S396 and S397, S268 and S269 and S301 and S302.

If the retrieval key 165 is pressed in step S270, the process returns to step S237 to wait for instruction of retrieval method. If the directory key 162 is pressed in step S271, the retrieval operation is terminated.

After the input of a reading of step S254, if the retrieval key 165 is pressed in step S270, the process returns to step S237 to wait for instruction of retrieval method. If the directory key 162 is pressed in step S271, the retrieval is regarded as interrupted and the process ends.

Next, a key telephone system according to another embodiment of the present invention will be described below. In this embodiment, the system has a common abbreviated number index as well as the individual abbreviated number index arranged at each extension. The contents of this common abbreviated number index can be registered and updated only from a specific extension. The contents of the individual abbreviated number index can be registered and updated from only a corresponding extension. It should be noted that the construction of the system is similar to that in FIG. 13.

Figure 26:
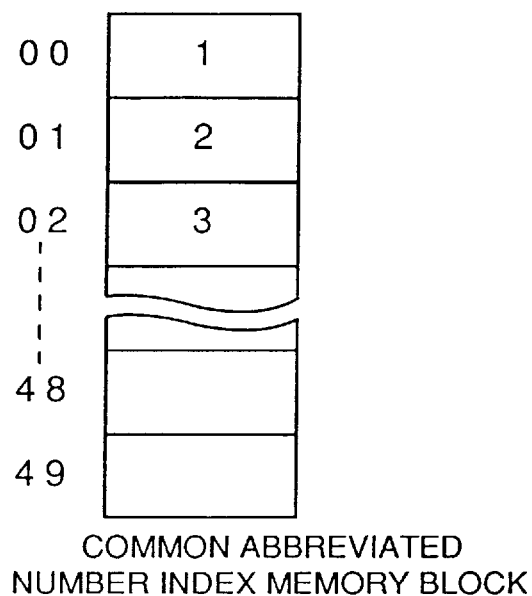
FIG. 26 is a diagram showing a common abbreviated number index memory block in a key telephone system according to another embodiment of the present invention.

FIG. 26 illustrates the structure of the common abbreviated number index memory block ("COM ABB MEM" in the drawings) in which block numbers of directory data corresponding to common abbreviated dialling numbers are stored. In FIG. 26, dialling data of abbreviated dialling number "00" is stored in the block 1 in FIG. 14. Similarly, dialling data of abbreviated dialling numbers "01" and "02" are stored in the blocks 2 and 3. It should be noted that the blocks of abbreviated dialling numbers "00" to "49" are assigned to common abbreviated dialling numbers.

Figure 27:
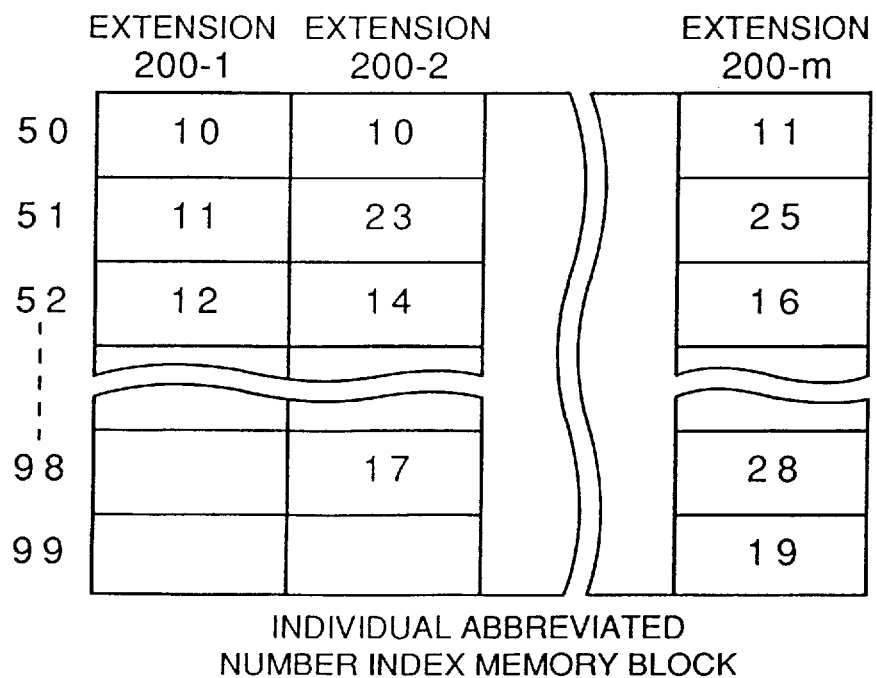
FIG. 27 is a diagram showing an individual abbreviated number index memory block in the system.

FIG. 27 illustrates the structure of the individual abbreviated number index memory. In the index memory, block numbers indicating directory data corresponding to individual abbreviated dialling numbers of each extension are stored. It should be noted that the blocks of abbreviated dialling numbers "50" to "99" are assigned to individual abbreviated dialling numbers.

The other memory blocks in this system corresponds to those in FIGS. 6, 14 and 15.

Figure 17:
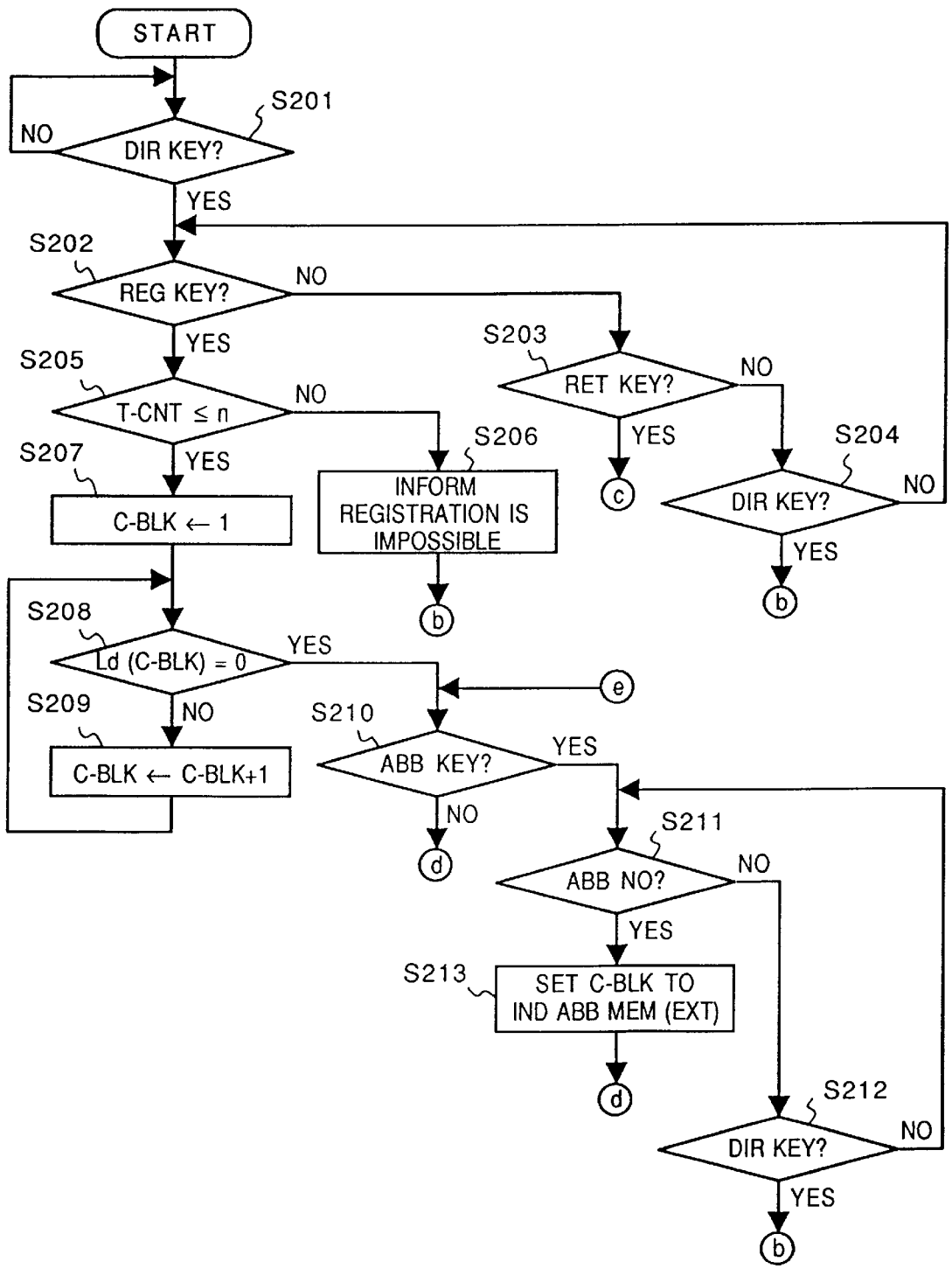
FIGS. 17 to 20 are flowcharts showing data registration operation in the system.
Figure 18:
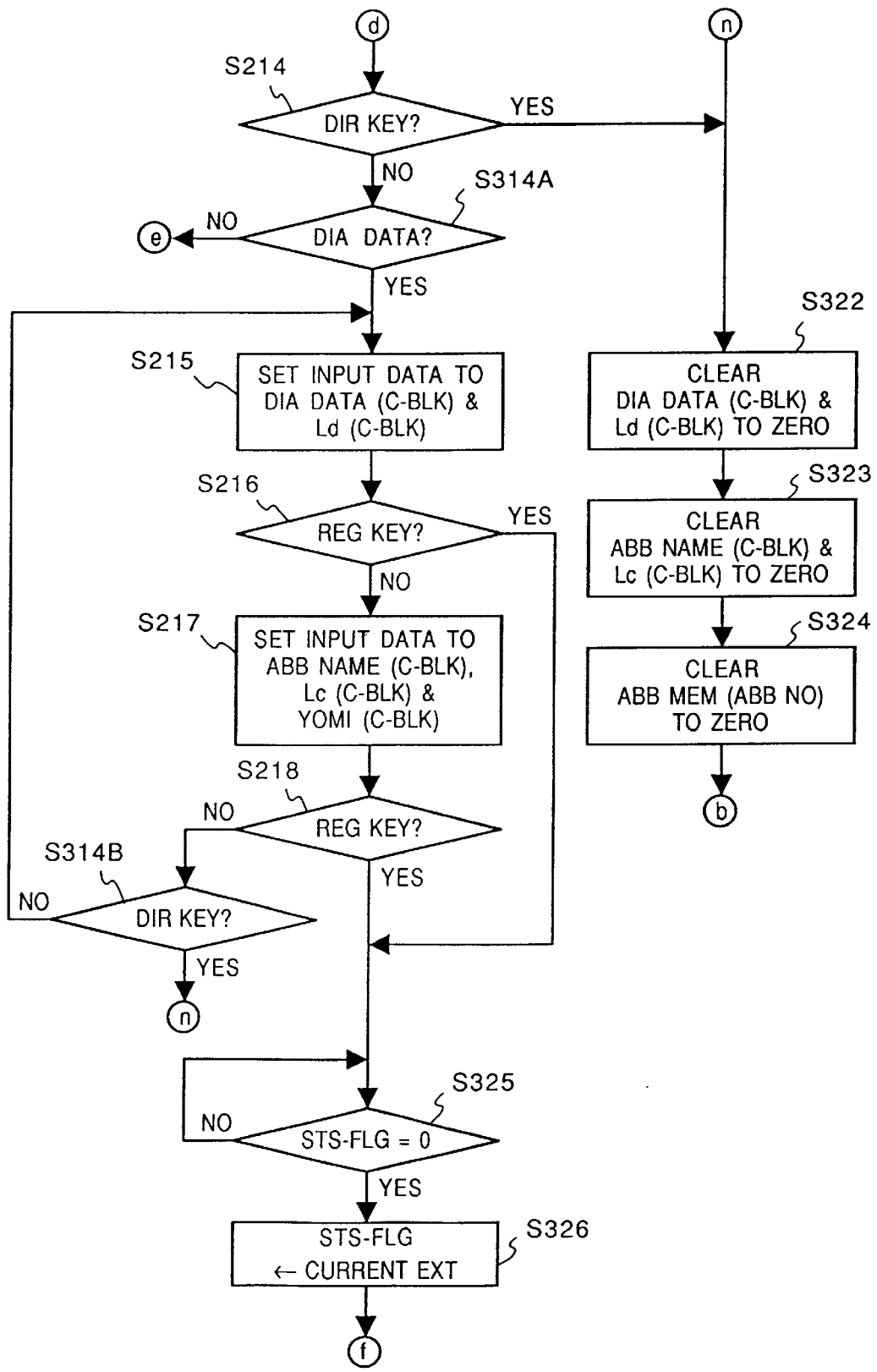
Figure 19:
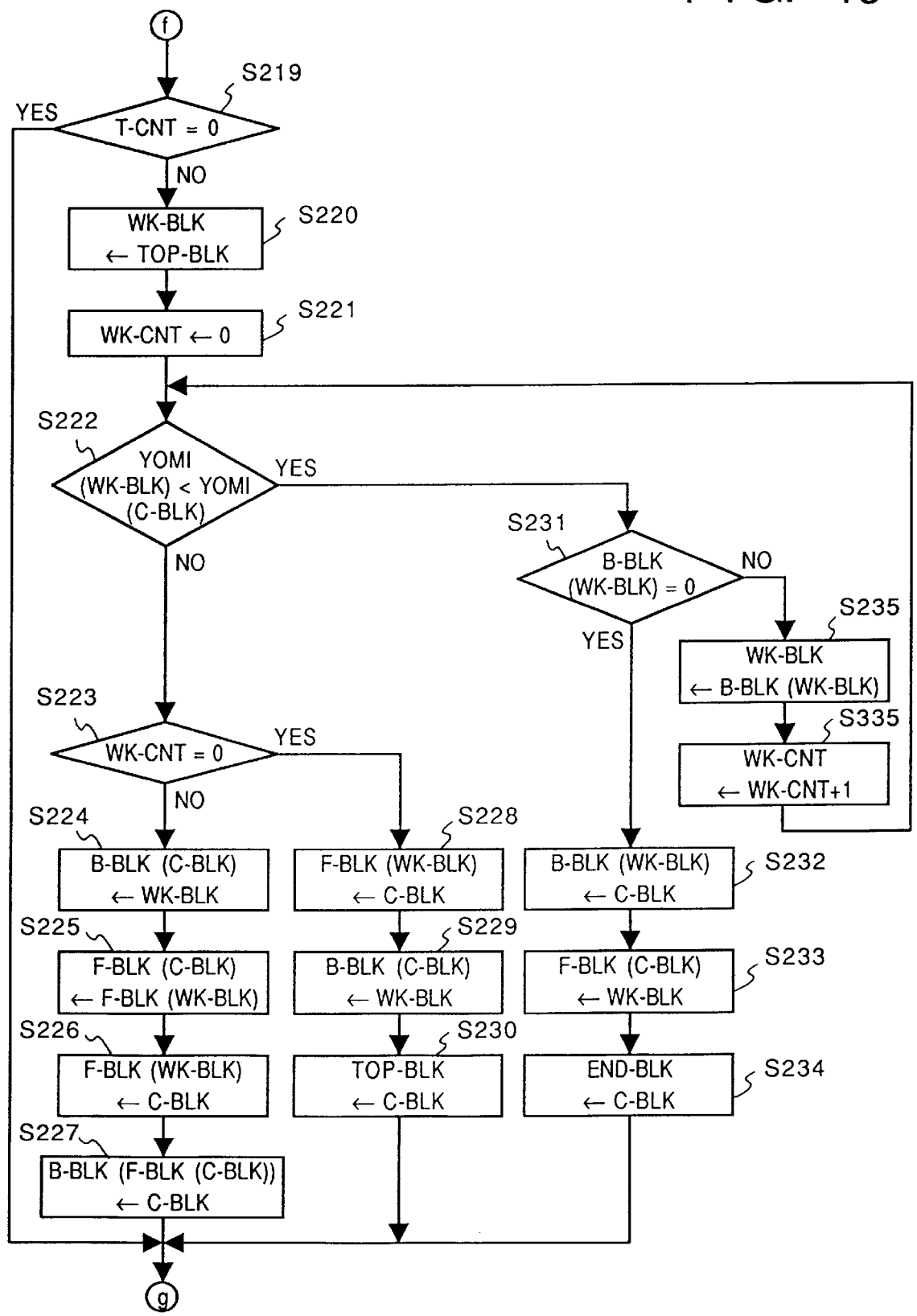
Figure 20:
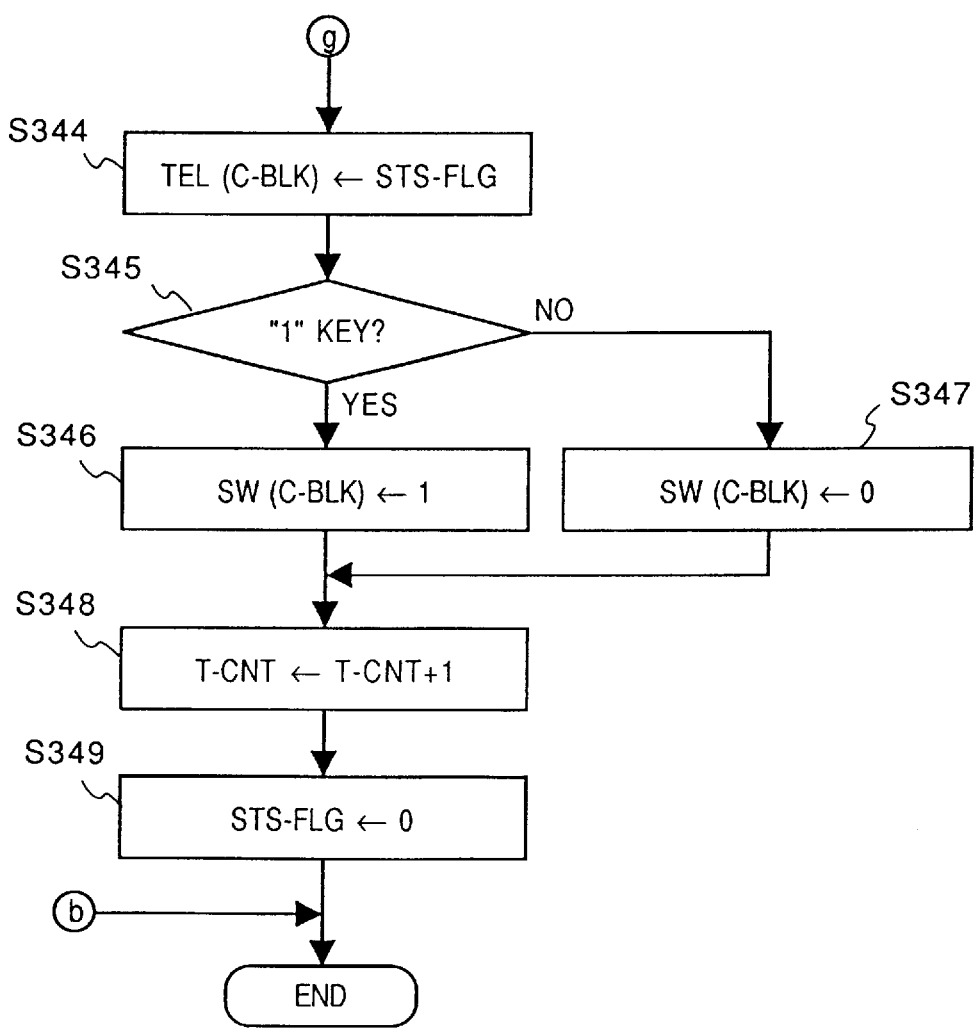
Figure 21:
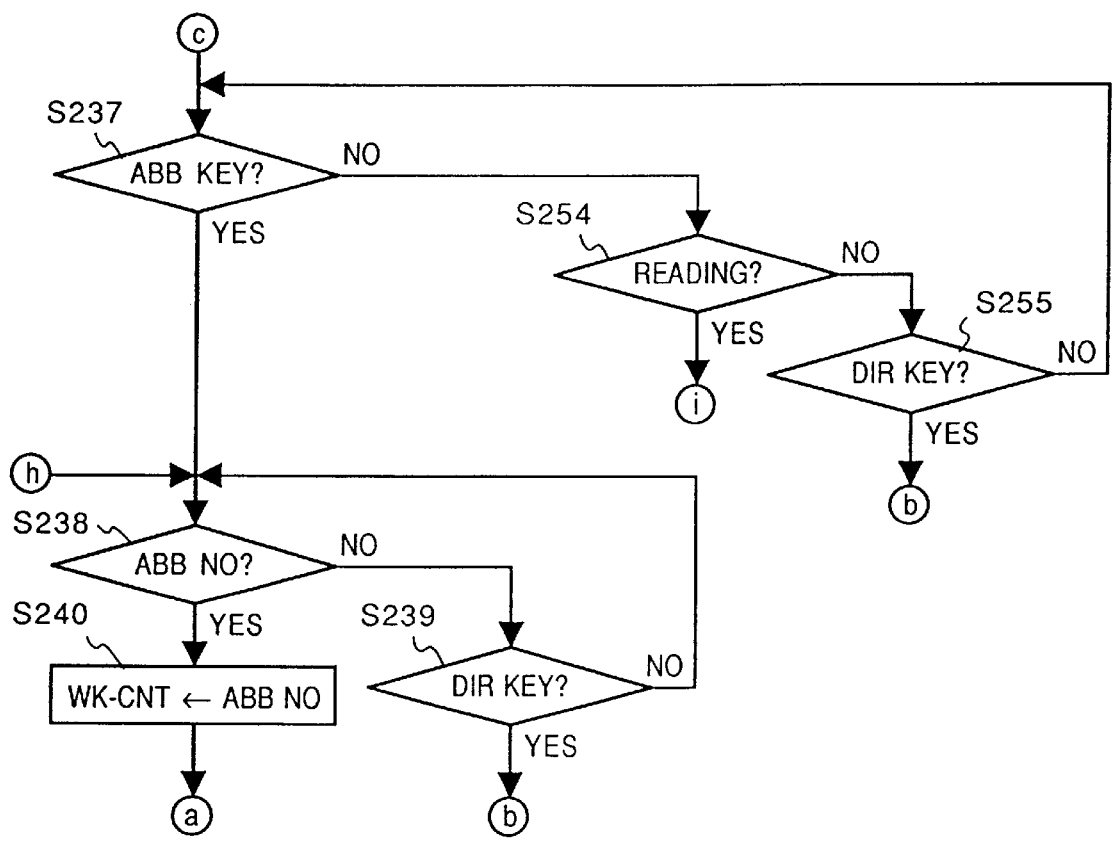
FIGS. 21 to 25 are flowcharts showing data retrieval operation in the system.
Figure 22:
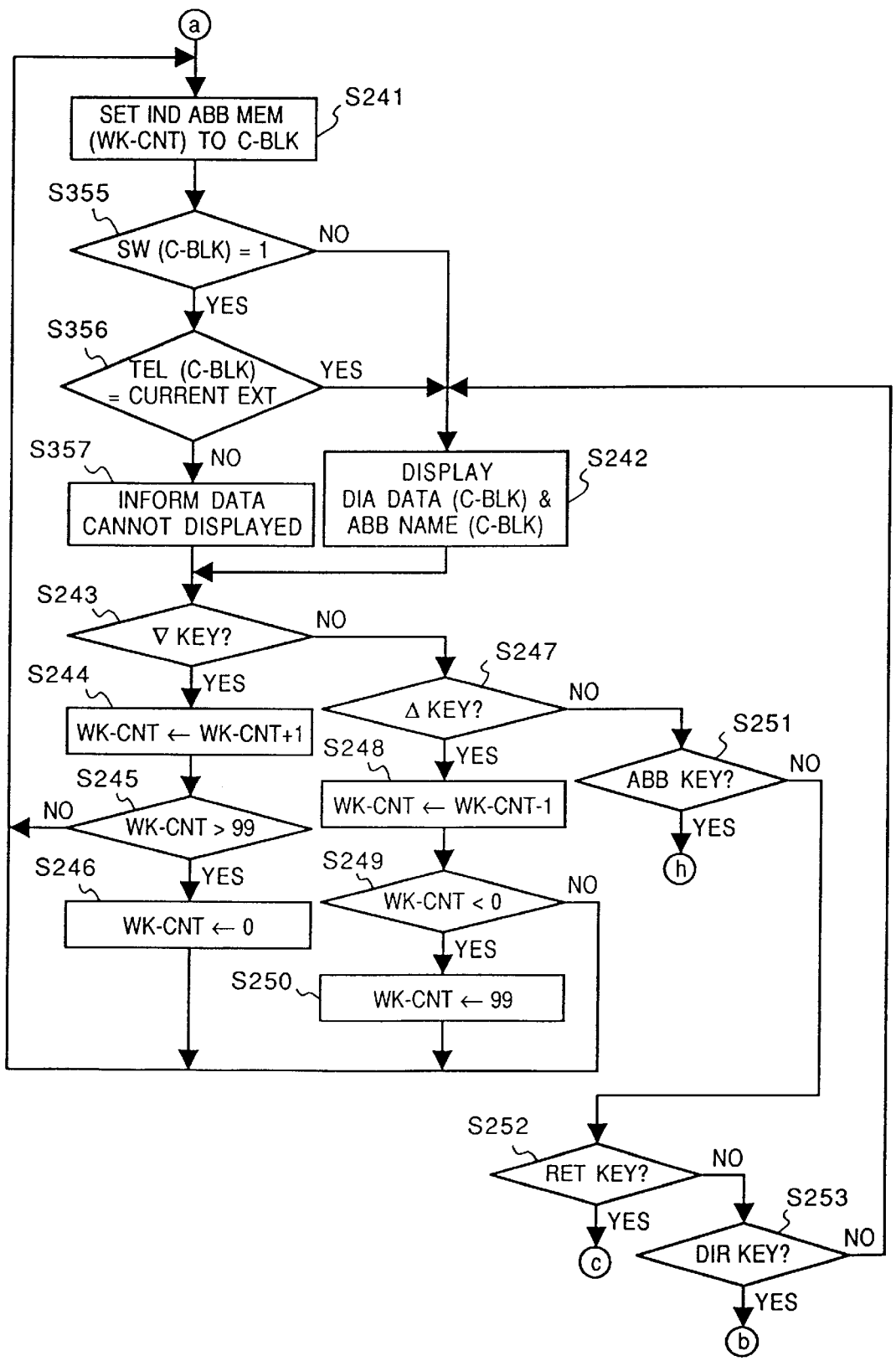
Figure 23:
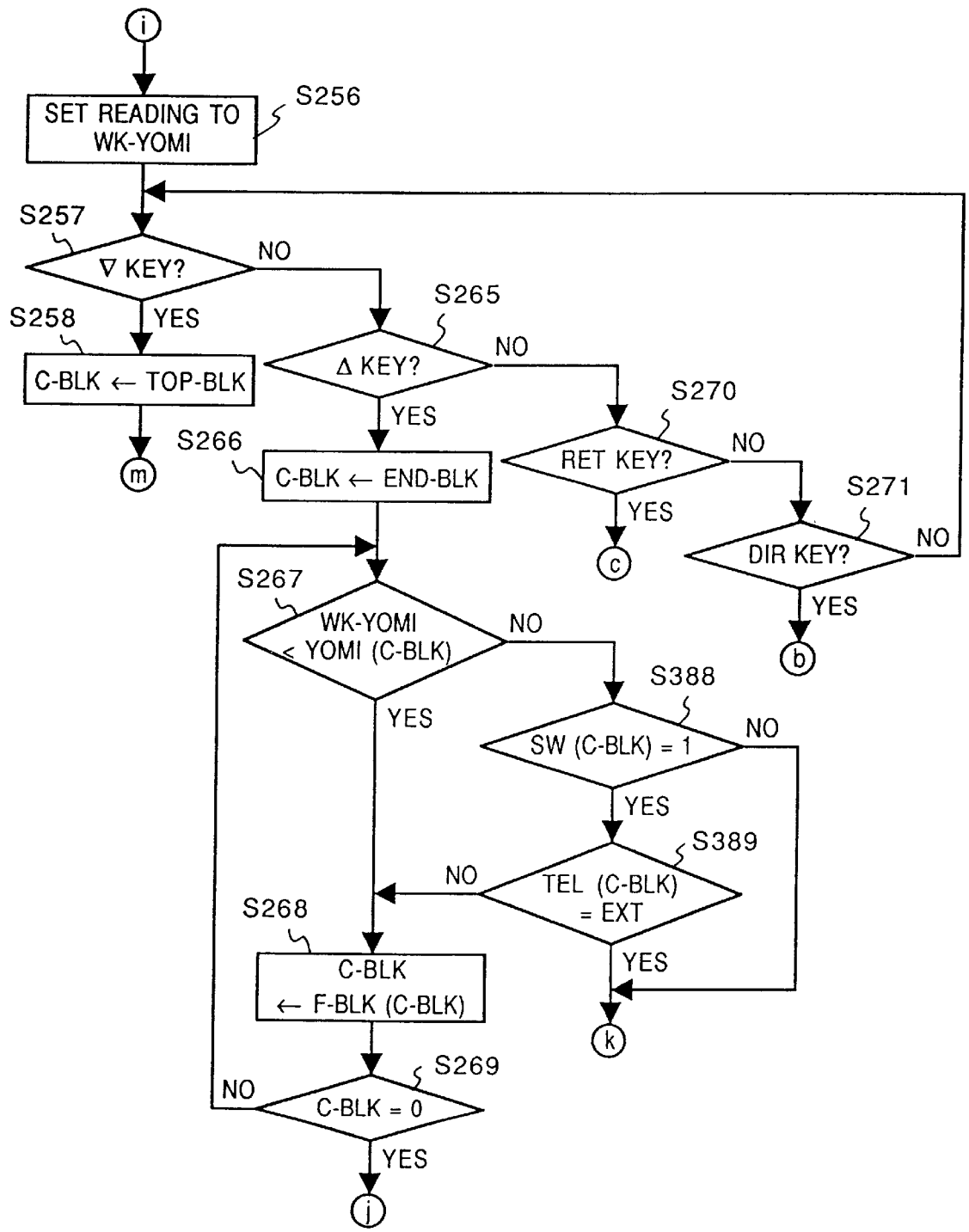
Figure 24:
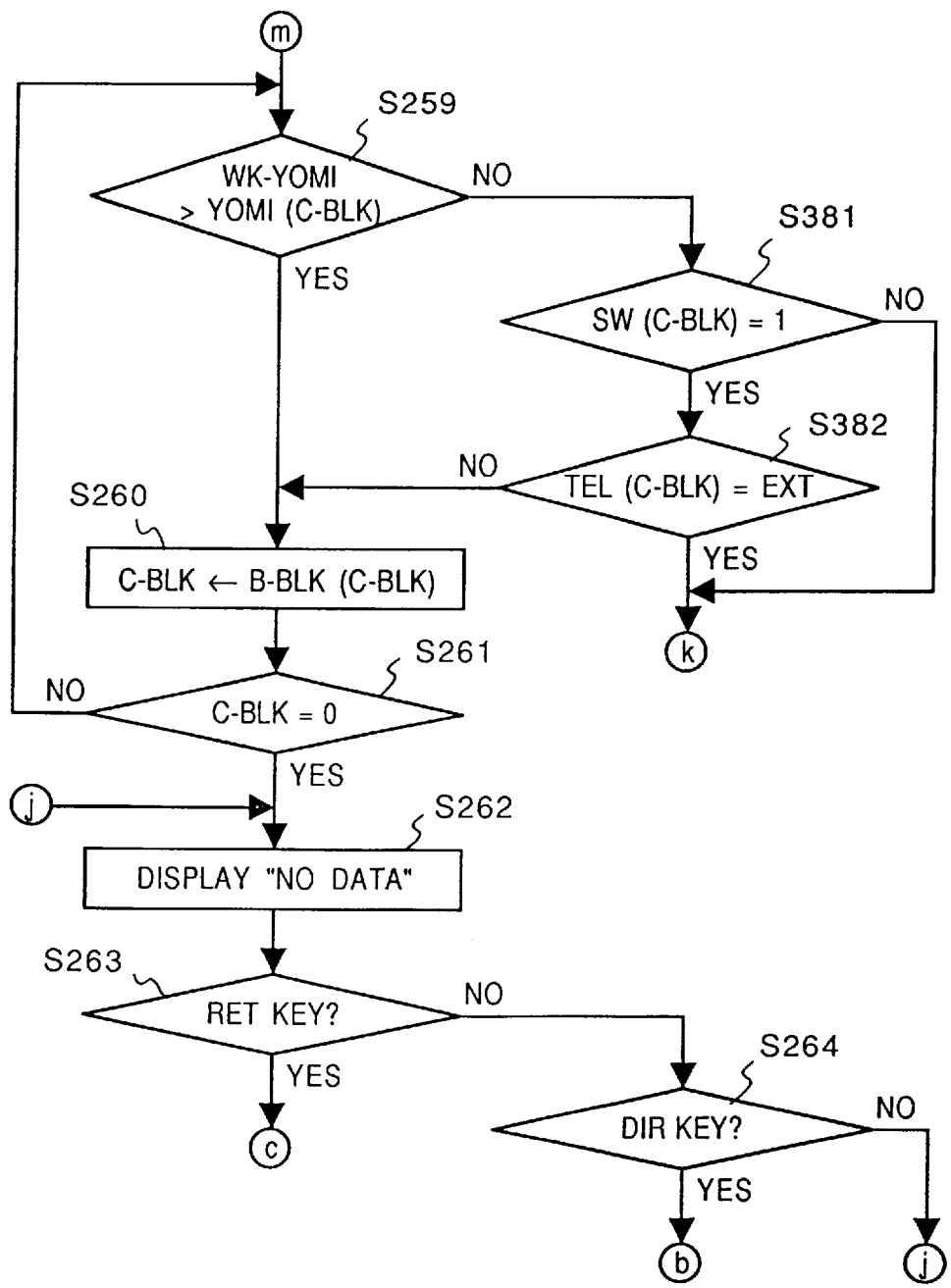
Figure 28:
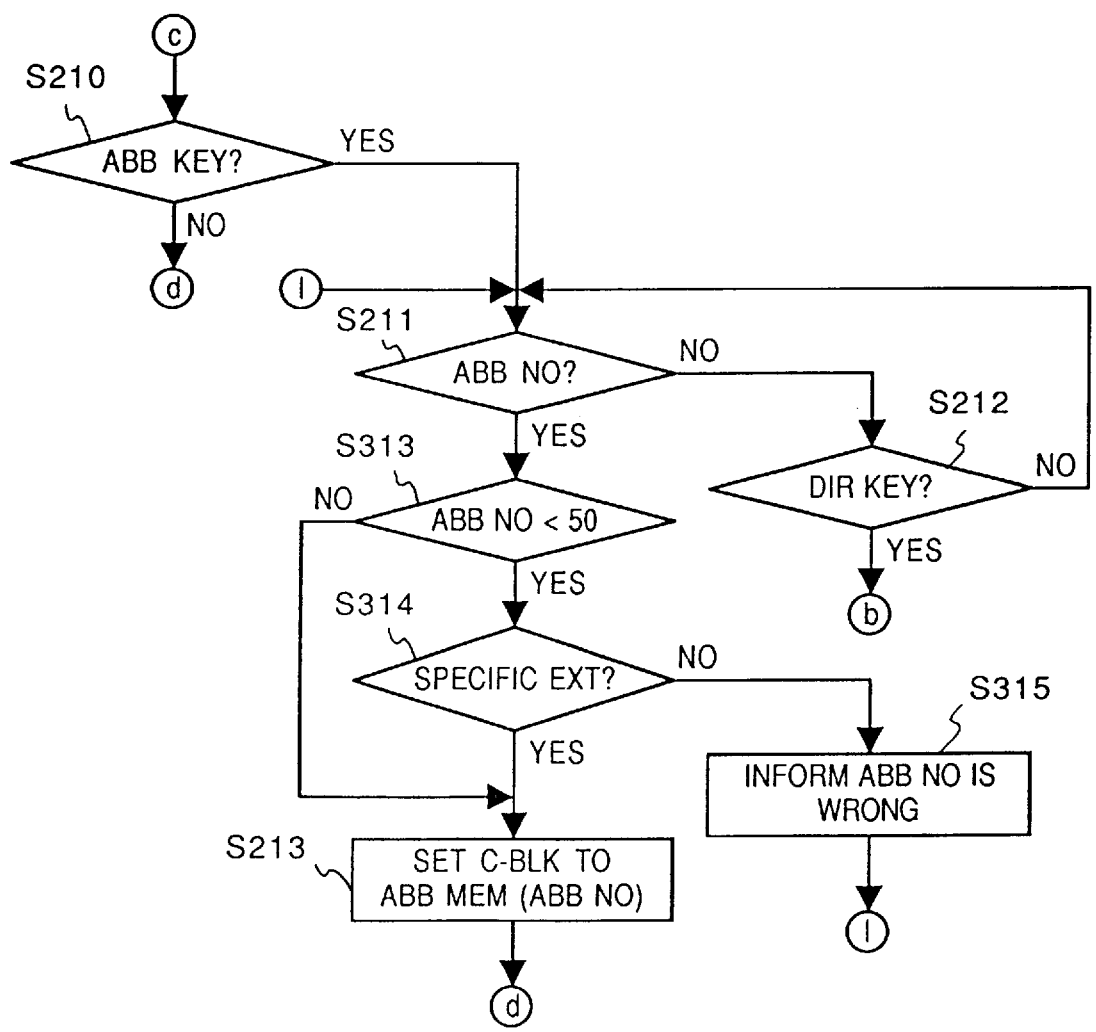
FIG. 28 is a flowchart showing a part of data registration operation in the system.

FIG. 28 is a flowchart showing a part of directory data process corresponding to FIG. 17. In this flowchart, operations except those in FIG. 28 correspond to the flowchart of FIG. 17 and therefore the explanations of the corresponding operations will be omitted.

In step S210, if the abbreviation key 169 is pressed and a two-digit abbreviated dialling number is inputted in step S211, whether the input abbreviated dialling number is a common abbreviated dialling number or not is checked in step S313. If YES, whether the input is from a specific extension allowed to register common abbreviated dialling numbers or not is checked in step S314. This examination is made by comparing a data registered in the RAM 406 in advance with an extension accommodation position, an extension number, a password, etc. It can be arranged such that all the extensions can register the common abbreviated dialling numbers.

In step S314, if the input is not from the specific extension, it is determined that a wrong abbreviated dialling number has been inputted, then indication such as a message informing that the abbreviated dialling number is wrong is displayed on the display 107 in step S315. Thereafter, the process returns to step S211 to wait for an input of an abbreviated dialling number. In step S314, if the extension currently being operated is the specific extension, the value of the C-BLK is set to a block number in the common abbreviated number index memory block corresponding to the input abbreviated dialling number in step S213, from which, registration and retrieval operations similar to those in the previous embodiment are performed.

Next, a key telephone system according to another embodiment of the present invention will be described below.

In this system, directory data are retrieved and registered as abbreviated dialling numbers. The memory blocks shown in FIGS. 6, 14, 15, 26 and 27 are employed in this embodiment. Further, the system construction corresponds to that in FIG. 13.

Figure 25:
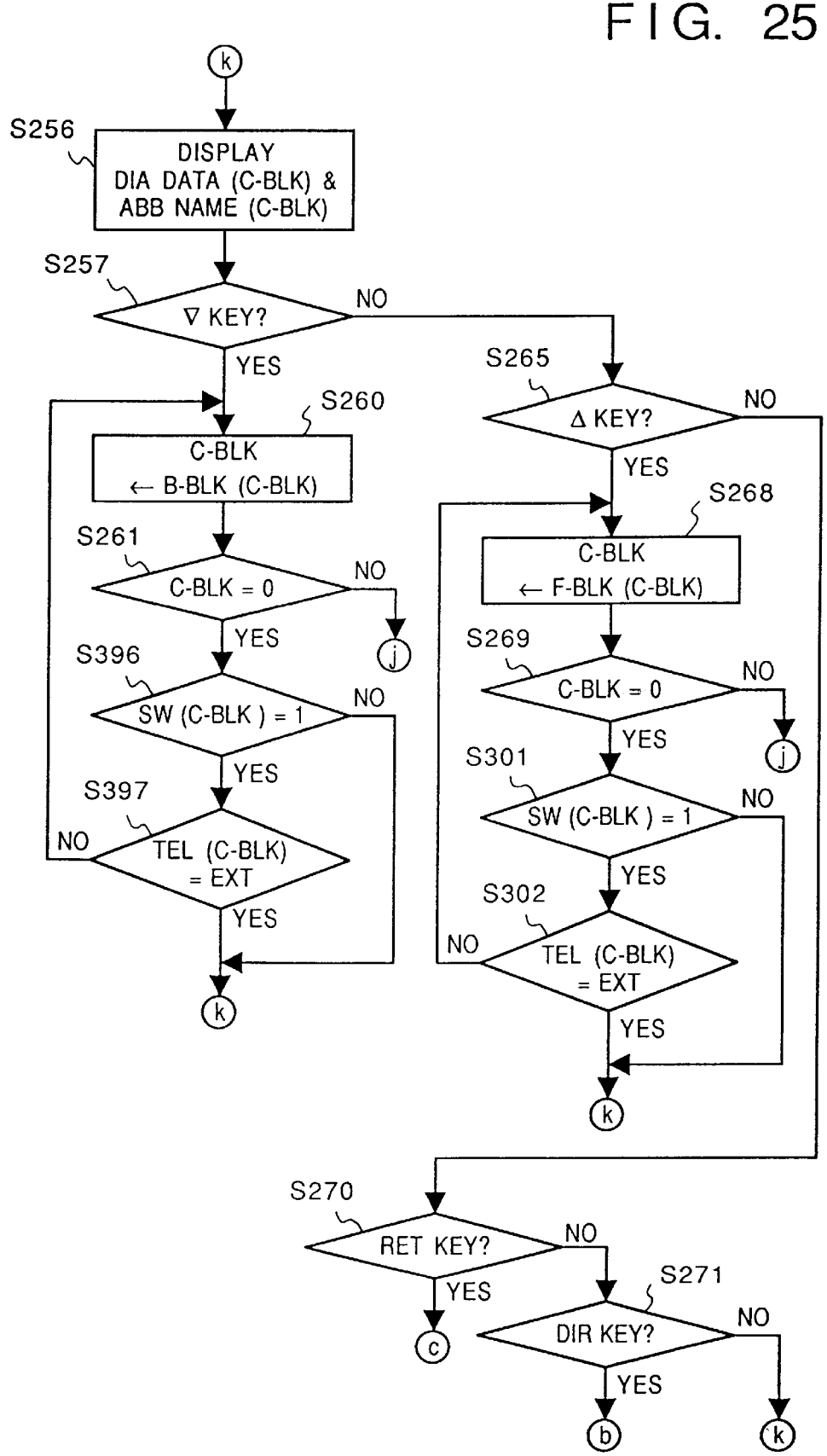
Figure 29:
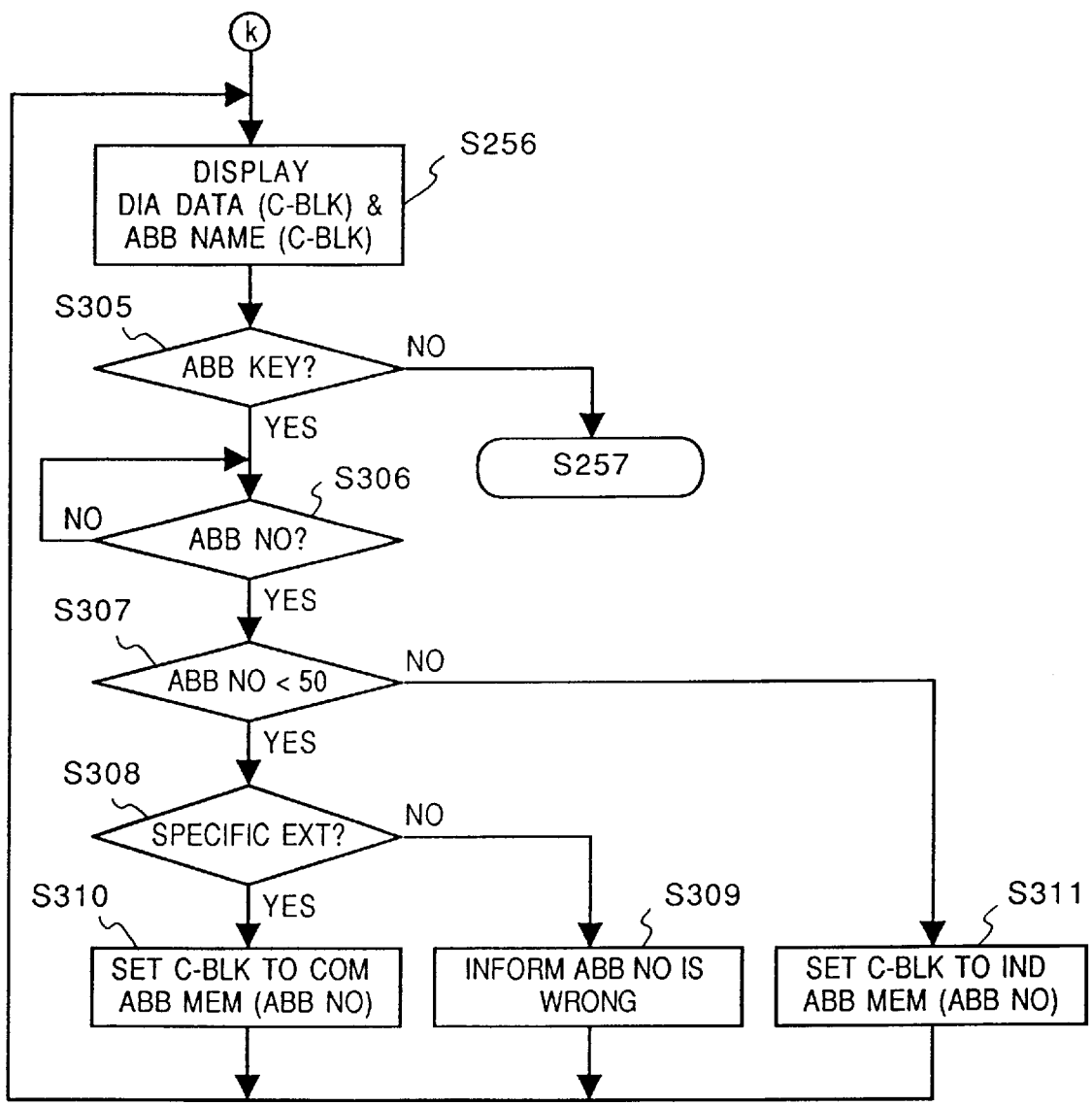
FIG. 29 is a flowchart showing a part of data retrieval operation of a key telephone system according to another embodiment of the present invention.

FIG. 29 is a flowchart showing a part of directory data process corresponding to FIG. 25. It should be noted that operations except those in FIG. 29 correspond to the flowchart of FIG. 25 and therefore the explanations of these corresponding operations will be omitted.

Retrieval operation with a reading of an abbreviated name data is performed in steps S254 and S256 and the subsequent steps. After a retrieved dialling data and its abbreviated name data are displayed in step S256, if the abbreviation key 169 is pressed in step S305, registration of the displayed data as an abbreviated dialling data follows. Note that operations in case of press of other keys correspond to those of the flowchart of FIG. 25 (from step S257 and the subsequent steps) and therefore the explanations of these cases will be omitted.

In step S305, if the abbreviation key 169 is pressed, an input of two-digit abbreviated dialling number is waited in step S306. When the input is detected, whether the input abbreviated dialling number is a common abbreviated dialling number or not is checked in step S307. If YES, whether the input is from a specific extension allowed to register common abbreviated dialling numbers or not is checked in step S308. This examination is made by comparing a data registered in the RAM 406 in advance with an extension accommodation position, an extension number, a password, etc. It can be arranged such that registrations from all the extension are allowed.

In step S308, if the input is not from the specific extension, it is determined that a wrong abbreviated dialling number has been inputted, then indication such as a message informing that the abbreviated dialling number is wrong is displayed on the display 107 in step S309. Thereafter, the process returns to step S256.

In step S308, if the extension currently being operated is the specific extension, the value of the C-BLK is set to a block number in the common abbreviated number index memory block corresponding to the input abbreviated dialling number in step S310. Thereafter, the process returns to step S256. In this manner, the currently displayed data indicated by the C-BLK is registered as a common abbreviated dialling number.

If the abbreviated dialling number inputted in step S307 is an individual abbreviated number of a corresponding extension, the value of the C-BLK is set to a block number in the individual abbreviated number index memory block corresponding to the input abbreviated dialling number in step S311. Thereafter, the process returns to step S256. In this manner, the currently displayed data indicated by the C-BLK is registered as an individual abbreviated dialling number.

Figure 30:
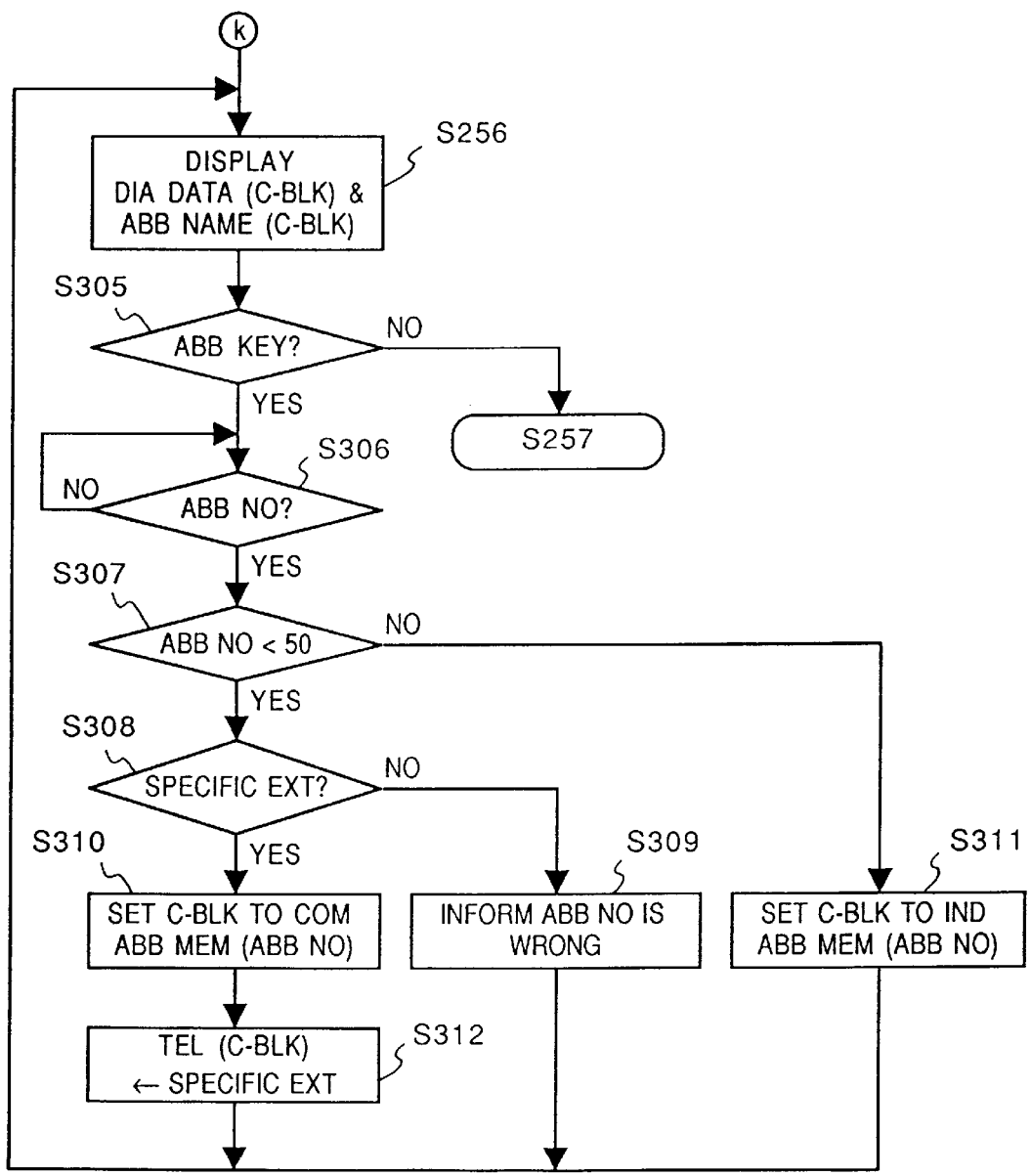
FIG. 30 is a flowchart showing a part of data retrieval operation according to another embodiment of the present invention.

FIG. 30 is a flowchart showing a part of directory data process in a key telephone system according to another embodiment of the present invention. It should be noted that operations other than those in FIG. 30 correspond to the operations in the system of the previous embodiment and therefore the explanations of the corresponding operations will be omitted.

In this system, if the data displayed in step S310 is registered as a common abbreviated dialling number, a number of the extension which registered the data is set to the TEL in step S312, so that the other extensions cannot update this common abbreviated dialling number.

In the embodiments, the YOMI is arranged in a directory data block in consideration of input of reading data of an abbreviated name data when it is displayed in kanji. (As described above, if an abbreviated name data to be displayed in kanji is "谷津" it reading according to a conversion dictionary is "タニツ (tanitsu)", however, the reading is inputted "ヤツ (yatsu)" as an actual reading.) However, if it is arranged such that the kanji characters are not displayed, the YOMI in the directory data block is not necessary, and a pointer chain can be formed by directly comparing the abbreviated name data.

Further a single-touch dialling index memory block can be employed in place of the abbreviated number index memory block, in this case, registration and retrieval operations by similar process to those in the above embodiments are possible.

In the registration operation in which an abbreviated dialling number is specified in the above embodiments, if the specified abbreviated dialling number is already registered, the content of the abbreviated dialling number index memory block is changed to a number of empty block but the directory data block is kept unchanged. The new data which is retrievable with both the abbreviated number and abbreviated name is added to the directory, and the initial data is not deleted and is retrievable with only its abbreviated name.

In the above embodiments, the keys 162 to 169 for the respective operations are arranged on the telephone as fixed special-function keys, however, the operations can be made by specific input using dialling keys.

Further, it can be arranged such that all the directory data can be retrieved if a specific extension is being operated regardless of the SW value.

As many apparently widely different embodiments of the present invention can be made without departing from the spirit and scope thereof, it is to be understood that the invention is not limited to the specific embodiments thereof except as defined in the appended claims.

What is claimed is:

1. A telephone having an electronic directory function comprising:

first memory means for storing names and dialing numbers so that the names correspond to the dialing numbers;

second memory means for storing correspondences, each between an abbreviated number and one of the dialing numbers;

retrieval means for retrieving a dialing number stored in said first memory means based on a name and for holding information indicating the retrieved dialing number;

input means for inputting an abbreviated number; and registration means for registering the held information, in correspondence with the abbreviated number inputted by said inputting means, into said second memory means, as correspondence between the inputted abbreviated number and the retrieved dialing number according to the held information.

2. A key telephone system having an electronic directory function comprising:

first memory means for storing names and dialing numbers so that the names correspond to the dialing numbers;

second memory means for storing correspondences, each between an abbreviated number and one of the dialing numbers;

retrieval means for retrieving a dialing number stored in said first memory means based on a name and for displaying information according to the retrieved dialing number;

input means for inputting an abbreviated number; and registration means for registering, based on an abbreviated number inputted when the information is displayed, correspondence between the inputted abbreviated number and the retrieved dialing number according to the displayed information into said second memory means.

3. The system according to claim 2, wherein said second memory means includes a common abbreviated number index area and an individual abbreviated number index area, and the contents of the common abbreviated number index area are registered from a specific extension, while the contents of the individual abbreviated number index area are registered from each extension.

4. The system according to claim 3, wherein said registration means performs registration to a selected one of the common abbreviated number index area and the individual abbreviated number index area.

5. The system according to claim 3, wherein said registration means prohibits updating of dialing data registered in the common abbreviated number index area by extensions other than the specific extension.

6. A telephone system to which a plurality of extensions are connected, comprising:

first memory means for storing dialing numbers; and second memory means for storing information indicating a position within said first memory means at which a desired dialing number is stored, in accordance with an abbreviated number and an extension number of one of the plurality of extensions from which the abbreviated number is input.

7. A method for retrieving a dialing number from a directory memory for common use by subscribers comprising the steps of:

detecting an input of a name to be called;

discriminating a subscriber from which the name is input; and retrieving a dialing number from the directory memory based on the name and the discriminated subscriber.

8. The method according to claim 7, wherein said retrieving step includes a step of determining whether a type of the dialing number is common or individual.

9. The method according to claim 8, wherein a dialing number is retrieved from the directory memory in consideration of the subscriber when the type of the dialing number is determined to be individual.

10. The method according to claim 7, wherein in said retrieving step, a dialing number is retrieved from the directory memory which is provided in an exchange unit.

11. The method according to claim 7, wherein in said retrieving step, a dialing number is retrieved from the directory memory in consideration of subscriber data which is stored corresponding to the dialing number in the directory memory.

12. An apparatus for retrieving a dialing number comprising:

memory means for storing dialing numbers in accordance with names and subscribers;

input means for inputting a name to be called;

discriminating means for discriminating a subscriber from which the name is input; and retrieving means for retrieving one of the dialing numbers based on the name and the subscriber.

13. The apparatus according to claim 12, wherein said retrieving means further determines whether a type of each of the dialing numbers is common or individual.

14. The apparatus according to claim 13, wherein said retrieving means takes the subscriber into consideration when the dialing number is determined to be individual.

15. The apparatus according to claim 12, wherein said discriminating means discriminates an extension from which the name is input.

16. An apparatus for retrieving a dialing number, comprising:

memory means for storing dialing numbers of destinations in accordance with the destinations' names and user identifications;

input means for inputting a name to be called; and retrieving means for retrieving one of the dialing numbers based on the name inputted by said input means and an identification of a user who inputs the name.

17. The apparatus according to claim 16, wherein the identification of the user is identified based on an extension number of a terminal by which the name is inputted.

18. The apparatus according to claim 16, wherein said memory means stores the dialing numbers in accordance with the destinations' names, the user identifications and access right information, and said retrieving means retrieves the one of the dialing numbers, which has a user identification corresponding to the identification of the user, or whose access is not limited by the access right information.

19. The apparatus according to claim 16, wherein said memory means stores the dialing numbers in accordance with the identifications of users who registers the dialing numbers.

20. A method for retrieving a dialing number, comprising the steps of:

inputting a name to be called;

detecting an identification of a user who inputs the name; and retrieving one of a plurality of dialing numbers in accordance with the name and the identification.

21. The method according to claim 20, wherein the name of a destination whose dialing number should be retrieved is inputted in said inputting step.

22. The method according to claim 20, wherein the identification of a user is detected based on an extension number of a terminal by which the name is inputted.

23. The method according to claim 20, wherein the one of the plurality of dialing numbers is retrieved in accordance with the name, the identification and access rights information for limiting users who can retrieve the dialing numbers.

24. The method according to claim 20, wherein the one of the plurality of dialing numbers, which is registered by the user, is retrieved in said retrieving step.

* * * * *